(12) United States Patent  (10) Patent No.: US 7,959,344 B2
Shin  (45) Date of Patent: *Jun. 14, 2011

(54) BACKLIGHT ASSEMBLY AND DISPLAY DEVICE HAVING THE SAME

(75) Inventor: Jin-Soo Shin, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/635,643

(22) Filed: Dec. 10, 2009

(65) Prior Publication Data

US 2010/0085504 A1   Apr. 8, 2010

Related U.S. Application Data

(63) Continuation of application No. 11/125,445, filed on May 10, 2005, now Pat. No. 7,651,257.

(30) Foreign Application Priority Data

Jun. 15, 2004  (KR) .................. 10-2004-0043917

(51) Int. Cl.
 *F21V 7/04*  (2006.01)
(52) U.S. Cl. .......... 362/633; 362/609; 362/634; 349/58; 349/65
(58) Field of Classification Search .................. 362/623, 362/632–634, 300–301; 349/58, 64–65, 349/70
See application file for complete search history.

(56) References Cited

U.S. PATENT DOCUMENTS

| | | | |
|---|---|---|---|
| 6,542,206 B1 | 4/2003 | Saito | |
| 6,594,143 B2 | 7/2003 | Yano et al. | |
| 6,854,856 B2 * | 2/2005 | Shin et al. | 362/613 |
| 6,870,582 B2 | 3/2005 | Hayashimoto et al. | |
| 7,224,416 B2 * | 5/2007 | Cha et al. | 349/60 |
| 2004/0008512 A1 | 1/2004 | Kim | |

FOREIGN PATENT DOCUMENTS

| | | |
|---|---|---|
| JP | 08-122775 | 5/1996 |
| JP | 09-090361 | 4/1997 |
| JP | 10-010534 | 1/1998 |
| JP | 10-069236 | 3/1998 |
| JP | 10-153763 | 6/1998 |
| JP | 10-3192515 | 12/1998 |
| JP | 2001-117084 | 4/2001 |
| JP | 2001283623 A | 12/2001 |
| JP | 2002-083512 | 3/2002 |
| JP | 2002-156622 | 5/2002 |

(Continued)

*Primary Examiner* — Thomas M Sember

(74) *Attorney, Agent, or Firm* — Innovation Counsel LLP

(57) ABSTRACT

In a backlight assembly and a display device having the same, a receiving container includes a bottom plate and sidewalls adjacent to the edges of the bottom plate. A molded frame includes a first plate surrounding the sidewalls and a second plate connected to a side of the first plate. A second plate is substantially parallel with the bottom plate. A lamp assembly includes a lamp cover received in the receiving container and a lamp received in the lamp cover. An optical module is interposed between the molded frame and the receiving container to improve optical characteristics of a light generated from the lamp. A fixing member is combined with fixing portions of the receiving container, the molded frame and the lamp assembly to fix the receiving container, the lamp cover and the molded frame to one another. As a result, the manufacturing process can be simplified and mechanical strength improved.

13 Claims, 24 Drawing Sheets

FOREIGN PATENT DOCUMENTS

| | | |
|---|---|---|
| JP | 2003-066416 | 3/2003 |
| JP | 2003-140117 | 5/2003 |
| JP | 2003-157021 | 5/2003 |
| JP | 2003-215583 | 7/2003 |
| KR | 1999-0020489 | 6/1999 |
| KR | 1020000058043 A | 9/2000 |
| KR | 20-0264848 | 2/2002 |
| KR | 1020030017253 A | 3/2003 |
| KR | 1020040036407 A | 4/2004 |
| WO | 00/58778 | 10/2000 |

\* cited by examiner

BACKLIGHT ASSEMBLY AND DISPLAY DEVICE HAVING THE SAME

CROSS-REFERENCE OF RELATED APPLICATION

The present application is a continuation of U.S. patent application Ser. No. 11/125,445 filed on May 10, 2008 which claims priority from Korean Patent Application No. 2004-43917, filed on Jun. 15, 2004, the disclosure of which are hereby incorporated herein by reference in their entirety.

BACKGROUND OF THE INVENTION

1. Field of the Invention

The present invention relates to a backlight assembly and a display device including the backlight assembly. More particularly, the present invention relates to a backlight assembly capable of simplifying the manufacturing process and improving mechanical strength, and a display device having the backlight assembly.

2. Description of the Related Art

A liquid crystal display (LCD) device is a display device having various characteristics, such as light weight, low power consumption, thin thickness, etc.

The LCD device displays an image using a liquid crystal. Electrical and optical characteristics of the liquid crystal vary in response to an electric field applied to the liquid crystal.

The LCD device includes a display panel that uses the liquid crystal to display an image and a backlight assembly that supplies the display panel with a light.

The backlight assembly includes a receiving container, a lamp assembly that generates the light, and an optical member that improves optical characteristics of the light, wherein the lamp assembly is combined with the receiving container and a molded frame that fixes the optical member.

The receiving container is combined with the lamp assembly and the molded frame.

The backlight assembly is assembled through complicated fabrication processes so that the number of steps for manufacturing the backlight assembly and a manufacturing time of the backlight assembly are increased.

SUMMARY OF THE INVENTION

In accordance with the present invention, a backlight assembly capable of simplifying the manufacturing process and improving mechanical strength is provided.

In accordance with the present invention, a display device including the above-mentioned backlight assembly is also provided.

A backlight assembly in accordance with an aspect of the present invention includes a receiving container, a molded frame, a lamp assembly, an optical module and a fixing member. The receiving container includes a bottom plate and a plurality of sidewalls that protrude from the edges of the bottom plate. The molded frame includes a first plate that surrounds the sidewalls and a second plate that is connected to a side of the first plate. The second plate is substantially parallel with the bottom plate. The lamp assembly includes a lamp cover that is received in the receiving container and a lamp that is received in the lamp cover. The optical module is interposed between the molded frame and the receiving container to improve optical characteristics of a light generated from the lamp. The fixing member is combined with fixing portions of the receiving container, the molded frame and the lamp assembly to fix the receiving container, the lamp cover and the molded frame to one another.

A backlight assembly in accordance with another aspect of the present invention includes a receiving container, a molded frame, a lamp assembly, an optical module, fixing portions and a fixing member.

The receiving container includes a bottom plate and sidewalls protruding from the sides of the bottom plate. The molded frame includes a first plate combined with one of the sidewalls and a second plate that is substantially parallel with the bottom plate.

The lamp assembly includes a lamp cover and a lamp that is received in the lamp cover. The lamp cover has a lower plate, an upper plate that is substantially parallel with the second plate and a side plate connected between the lower and upper plates. The optical module is interposed between the molded frame and the receiving container to improve optical characteristics of a light generated from the lamp.

The fixing portions are formed on the receiving container, the lamp assembly and the molded frame. The fixing member is combined with the fixing portions through one assembling step.

A display device in accordance with an aspect of the present invention includes a receiving container, a molded frame, a lamp assembly, an optical module, a fixing member and a display panel. The receiving container includes a bottom plate and a plurality of sidewalls that protrude from the edges of the bottom plate. The molded frame includes a first plate that surrounds the sidewalls and a second plate that is connected to a side of the first plate, the second plate being substantially parallel with the bottom plate. The lamp assembly includes a lamp cover that is received in the receiving container and a lamp that is received in the lamp cover. The optical module is interposed between the molded frame and the receiving container to improve optical characteristics of a light generated from the lamp assembly. The fixing member is combined with fixing portions of the receiving container, the molded frame and the lamp assembly to fix the receiving container, the lamp cover and the molded frame to one another. The display panel is on the molded frame to convert the light passed through the optical module into an image light.

A display device in accordance with another aspect of the present invention includes a receiving container, a molded frame, a lamp assembly, an optical module, fixing portions, a fixing member and a display panel.

The receiving container includes a bottom plate and sidewalls protruded from sides of the bottom plate. The molded frame includes a first plate combined with one of the sidewalls and a second plate that is substantially parallel with the bottom plate.

The lamp assembly includes a lamp cover and a lamp that is received in the lamp cover. The lamp cover has a lower plate, an upper plate that is substantially parallel with the second plate and a side plate connected between the lower and upper plates. The optical module is interposed between the molded frame and the receiving container to improve optical characteristics of a light generated from the lamp.

The fixing portions are formed on the receiving container, the lamp assembly and the molded frame. The fixing member is combined with the fixing portions through one assembling step.

The display panel is on the molded frame to change the light passed through the optical module into an image light.

The fixing portions may be combined with the fixing member through a screw engagement, a wedged engagement, a hook engagement, etc.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE EMBODIMENTS

It should be understood that the exemplary embodiments of the present invention described below may be varied and modified in many different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not of limitation.

Hereinafter, the present invention will be described in detail with reference to the accompanying drawings.

Figure 1:
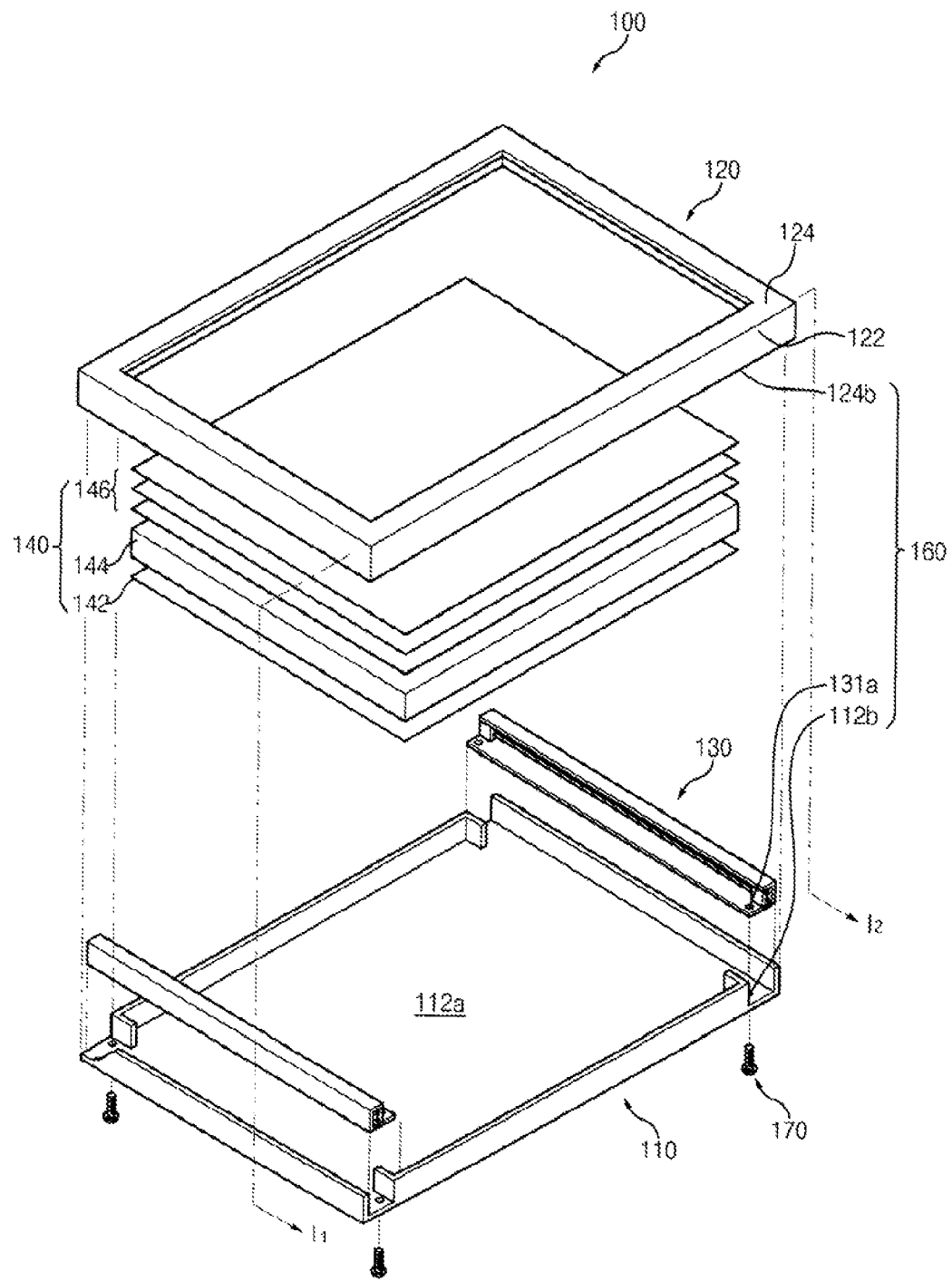
FIG. 1 is an exploded perspective view showing a backlight assembly in accordance with an exemplary embodiment of the present invention.
Figure 2:
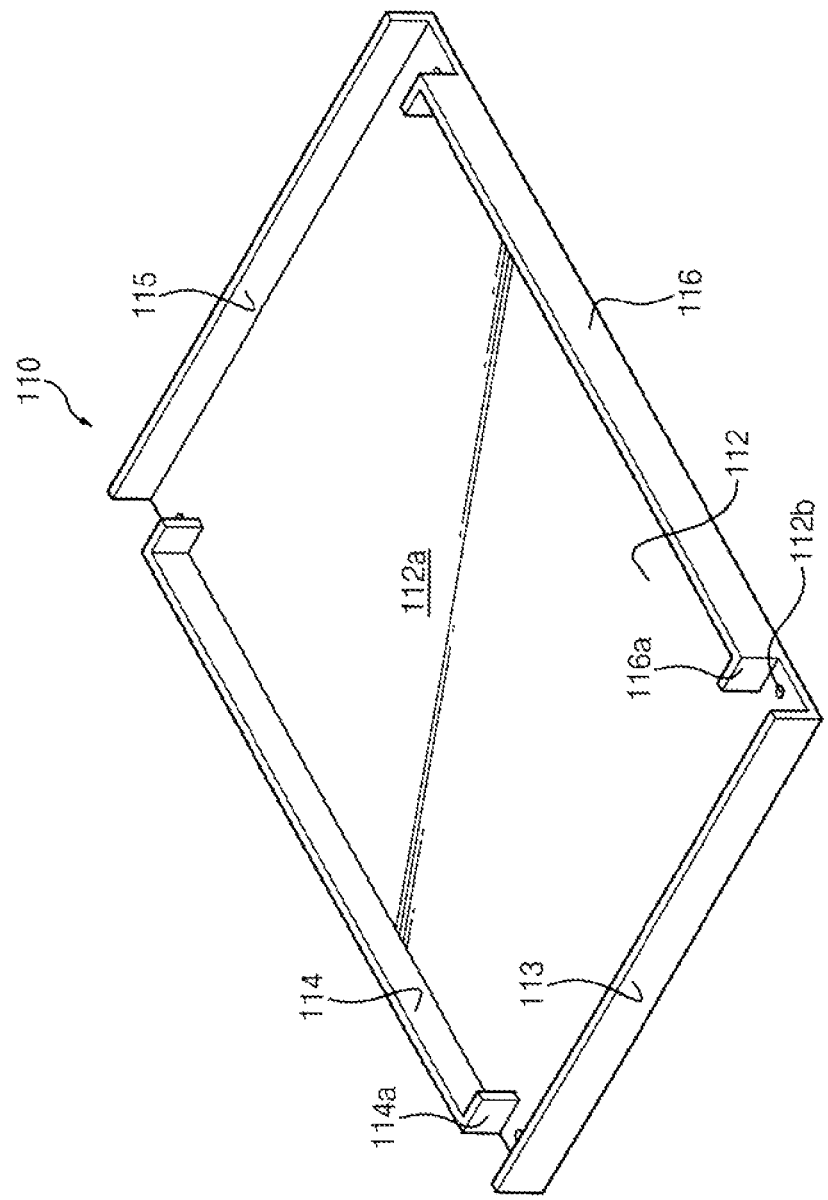
FIG. 2 is a perspective view showing a receiving container of FIG. 1.

FIG. 1 is an exploded perspective view showing a backlight assembly in accordance with an exemplary embodiment of the present invention. FIG. 2 is a perspective view showing a receiving container of FIG. 1.

Referring to FIGS. 1 and 2, the backlight assembly 100 includes a receiving container 110, a molded frame 120, a lamp assembly 130, an optical module 140, fixing portions 160 and a fixing member 170. The fixing portions 160 are formed on the receiving container 110, the molded frame 120 and the lamp assembly 130, respectively.

The receiving container 110 includes a bottom plate 112, a first sidewall 113, a second sidewall 114, a third sidewall 115 and a fourth sidewall 116. The bottom plate 112 has a rectangular plate shape. The first, second, third and fourth sidewalls 113, 114, 115 and 116 protrude from the edges of the bottom plate 112 to form a receiving space 112a.

In this exemplary embodiment, end portions 114a and 116a of the second and fourth sidewalls 114 and 116 are bent toward the receiving space 112a so that the receiving space 112a adjacent to the corners of the receiving container 110 is partially open. In this exemplary embodiment, the bent end portions 114a and 116a of the second and fourth sidewalls 114 and 116 are substantially perpendicular to the remaining portions of the second and fourth sidewalls 114 and 116. The bent end portions 114a and 116a prevent drifting of the optical member 140.

Figure 3:
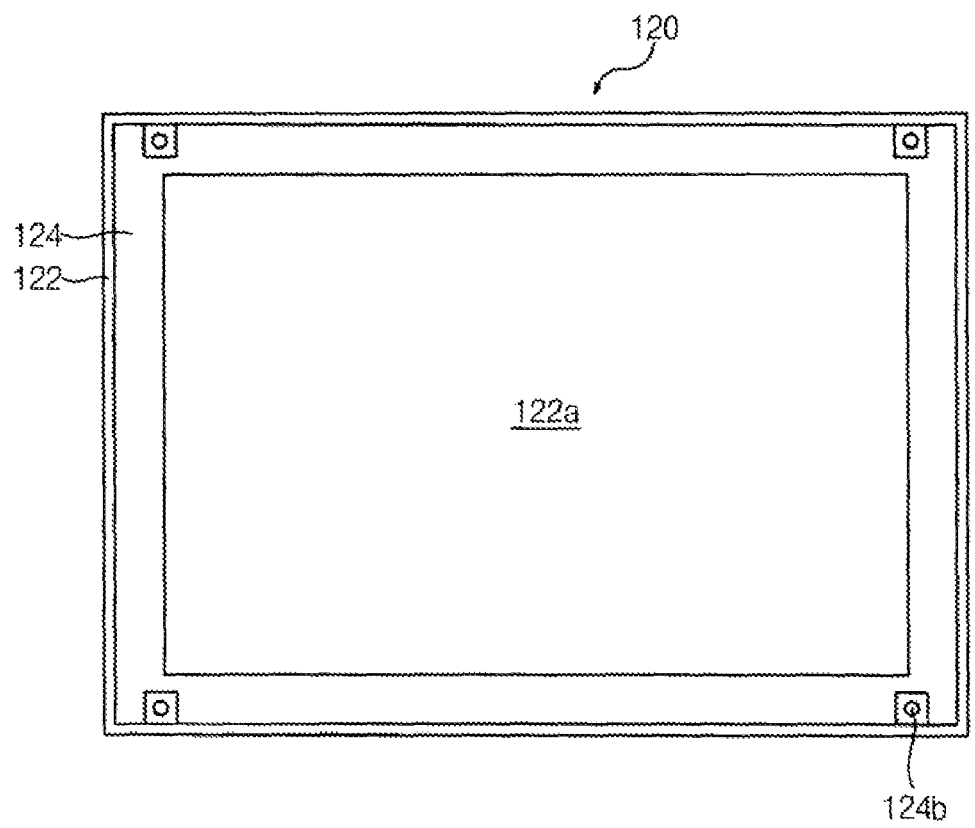
FIG. 3 is a plan view showing a rear face of a molded frame of FIG. 1.

FIG. 3 is a plan view showing a rear face of a molded frame of FIG. 1.

Referring to FIGS. 1 and 3, the molded frame 120 is combined with the receiving container 110. The molded frame 120 includes a first plate 122 and a second plate 124.

The first plate 122 is combined with the first, second, third and fourth sidewalls 113, 114, 115 and 116 of the receiving container 110. When the molded frame 120 is mated with the receiving container 110, the first plate 122 is positioned adjacent to the outer surfaces of the first, second, third and fourth sidewalls 113, 114, 115 and 116. The first plate 122 may include a hook for hooking the first, second, third and fourth sidewalls 113, 114, 115 and 116. The second plate 124 extends from the edges of the first plate 122, and is substantially parallel with the bottom plate 112. The second plate 124 has a quadrangular frame shape including an opening 122a on a central portion of the second plate 124.

Figure 4:
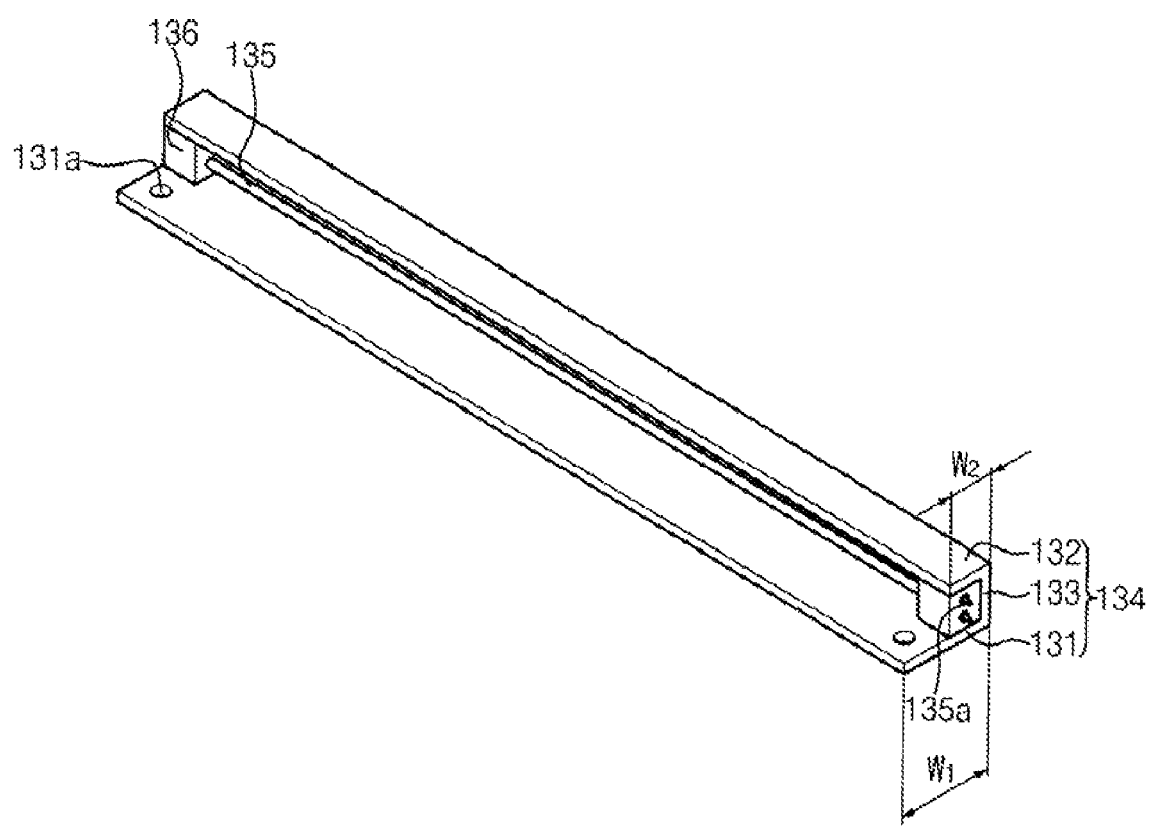
FIG. 4 is a perspective view showing a lamp assembly of FIG. 1.

FIG. 4 is a perspective view showing a lamp assembly of FIG. 1.

Referring to FIGS. 1 and 4, the lamp assembly 130 includes a lamp cover 134 and a lamp 135. The lamp assembly 130 may further include a lamp holder 136.

The lamp cover 134 is received in the receiving space 112a of the receiving container 110. A light generated from the lamp 135 is reflected from the lamp cover 134 to be guided into a central portion of the backlight assembly 100.

In this exemplary embodiment, the lamp cover 134 includes a first light reflecting plate 131, a second light reflecting plate 132 and a third light reflecting plate 133.

The first light reflecting plate 131 has a plate shape, and is substantially parallel with the bottom plate 112 of the receiving container 110. The second light reflecting plate 132 is substantially parallel with the second plate 124 of the molded frame 120. The third light reflecting plate 133 is substantially parallel with the first sidewall 113 and/or the third sidewall 115. The third light reflecting plate 133 makes contact with one of the first and third sidewalls 113 and 115, and connects the first light reflecting plate 131 to the second light reflecting plate 132.

A first width W1 of the first light reflecting plate 131 is greater than a second width W2 of the second light reflecting plate 132.

The lamp 135 of the lamp assembly 130 generates the light that is emitted in a radial direction based on a driving voltage that is provided from a power source external to the lamp assembly 130. In this exemplary embodiment, the lamp 135 is a cold cathode fluorescent lamp (CCFL) having a cylindrical shape.

The lamp 135 is received in the lamp cover 134, and the light is reflected from the first, second and third light reflecting plates 131, 132 and 133 to be guided into a space between the first and second light reflecting plates 131 and 132.

The lamp 135 may be fixed to a lamp holder 136 so that the lamp 135 is fixed on the lamp cover 134 at a predetermined position. The lamp holder 136 has a rectangular parallelepiped shape. The lamp holder 136 has a lamp fixing hole 135a into which an end portion of the lamp 135 is inserted. The lamp holder 136 is combined with the lamp cover 134.

Referring again to FIG. 1, the optical module 140 is received in the receiving space 112a of the receiving container 110. The optical module 140 modulates optical characteristics of the light generated from the lamp 135. The optical module 140 may include a reflecting plate 142, a light guiding plate 144, optical sheets 146, etc.

The reflecting plate 142 is positioned adjacent to the bottom plate 112 of the receiving container 110. The light guiding plate 144 is positioned adjacent to the reflecting plate 142. The light guiding plate 144 has a rectangular parallelepiped shape. The light guiding plate 144 guides the light from the lamp assembly 130 into the optical sheets 146. The optical sheets 146 are positioned adjacent to the light guiding plate 144. The optical sheets 146 diffuse the light from the light guiding plate 144, and a luminance when viewed in a plan view of the backlight assembly 100 is improved by the optical sheets 146.

The fixing portions 160 include a first fixing hole 131a, a second fixing hole 112b and a third fixing hole 124b. The first fixing hole 131a is formed on the lamp assembly 130. The second fixing hole 112b is formed on the receiving container 110. The third fixing hole 124b is formed on the molded frame 120. The receiving container 110, the lamp assembly 130 and the molded frame 120 are combined with one another by the fixing member 170. In this exemplary embodiment, the fixing member 170 is a screw that is inserted into the first, second and third fixing holes 112b, 131a and 124b.

Figure 5:
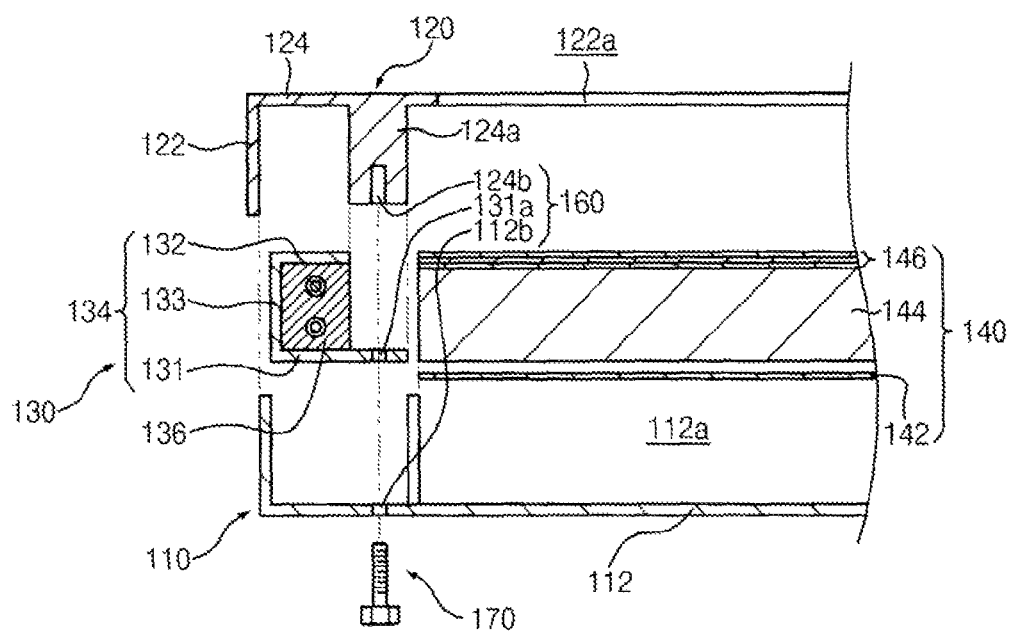
FIG. 5 is a cross-sectional view taken along a line $I^1$-$I^2$ of FIG. 1.

FIG. 5 is a cross-sectional view taken along a line $I^1$-$I^2$ of FIG. 1.

Referring to FIGS. 1, 2 and 5, the first fixing hole 131a is formed on the first light reflecting plate 131 that is positioned adjacent to the bottom plate 112. The second fixing hole 112b is formed on the bottom plate 112 of the receiving container 110 adjacent to the edge of the bottom plate 112.

The second fixing hole 112b of the receiving container 110 is positioned to correspond to the first fixing hole 131a of the lamp cover 134.

The molded frame 120 has a fixing boss 124a on the second plate 124. The third fixing hole 124b is formed in the fixing boss 124a. The third fixing hole 124b is positioned to correspond to the first fixing hole 131a. Therefore, the first, second and third fixing holes 131a, 112b and 124b are substantially coaxial.

Figure 6:
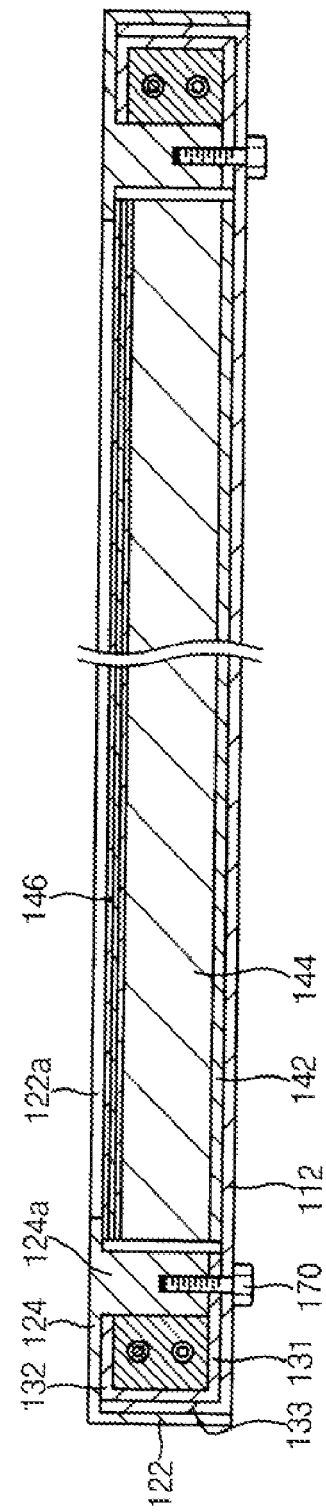
FIG. 6 is a cross-sectional view showing the backlight assembly of FIG. 1.

FIG. 6 is a cross-sectional view showing the backlight assembly of FIG. 1.

Referring to FIG. 6, the fixing member 170 that is the screw is inserted into the first fixing hole 131a formed on the first light reflecting plate 131 of the lamp cover 130, the second fixing hole 112b formed on the bottom plate 112 of the receiving container 110 and the third fixing hole 124b formed on the fixing boss 124a of the molded frame 120. That is, the screw is inserted into the third fixing hole 124b through the first and second fixing holes 131a and 112b. Therefore, the receiving container 110, the lamp assembly 130 and the molded frame 120 are securely fixed to one another using the fixing member 170.

Figure 7:
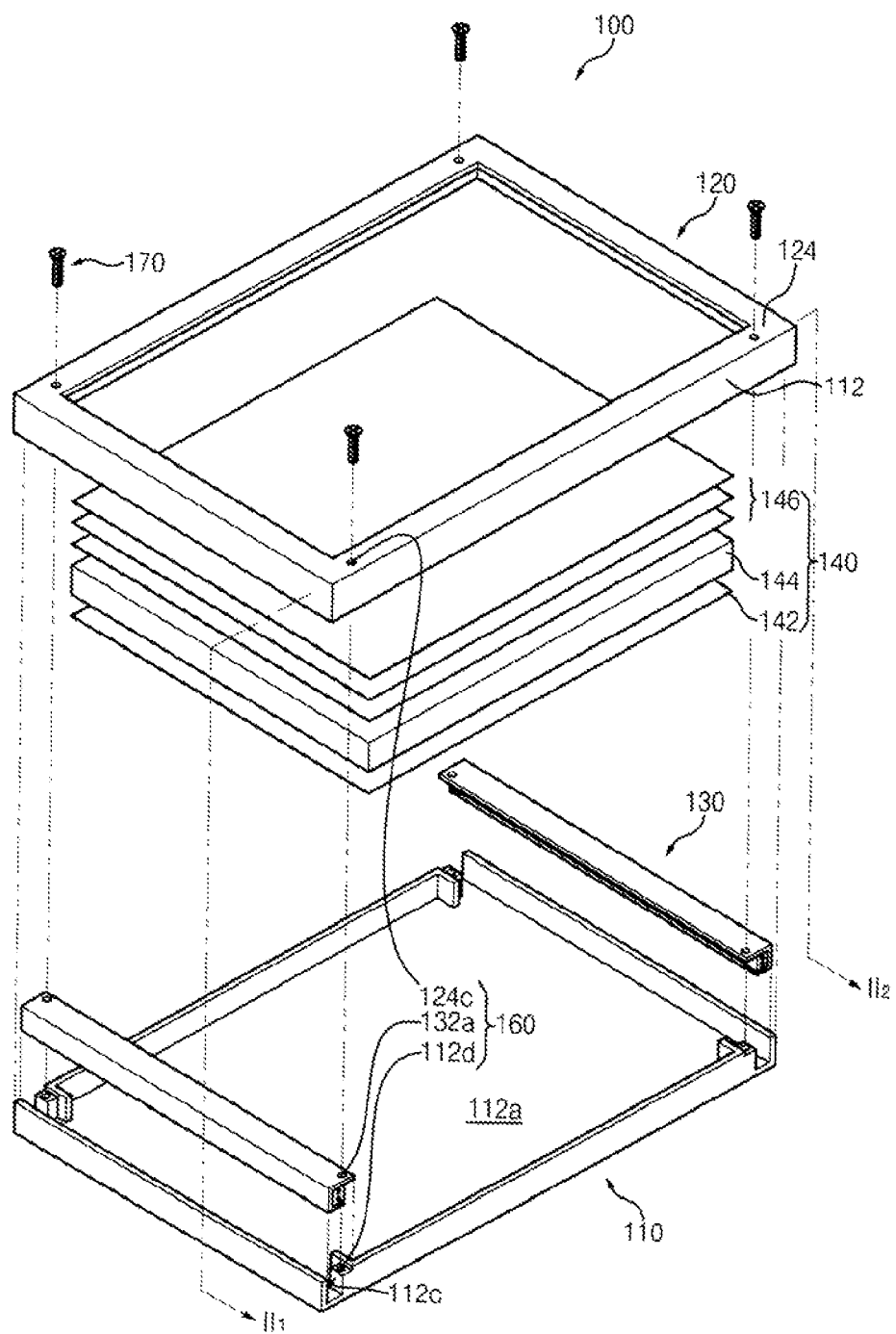
FIG. 7 is an exploded perspective view showing a backlight assembly in accordance with another exemplary embodiment of the present invention.
Figure 8:
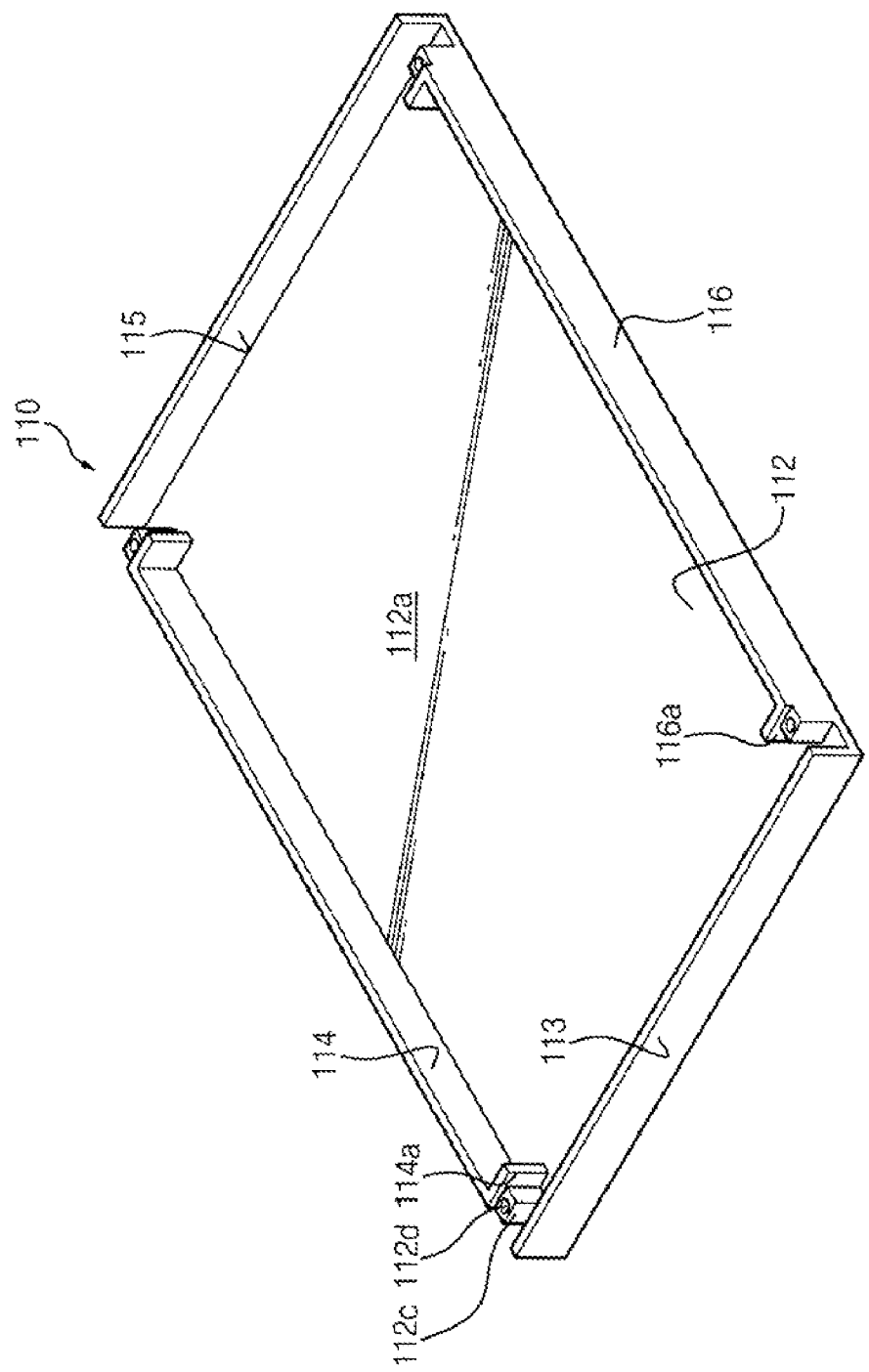
FIG. 8 is a perspective view showing a receiving container of FIG. 7.

FIG. 7 is an exploded perspective view showing a backlight assembly in accordance with another exemplary embodiment of the present invention. FIG. 8 is a perspective view showing a receiving container of FIG. 7. The backlight assembly of FIGS. 7 and 8 is substantially the same as the backlight assembly shown in FIGS. 1 to 6, except with respect to the location of the fixing portions and the fixing member. Thus, the same reference numerals will be used to refer to the same or similar parts as those described in FIGS. 1 to 6 and any further explanation will be omitted.

Referring to FIGS. 7 and 8, the backlight assembly 100 includes a receiving container 110, a molded frame 120, a lamp assembly 130, an optical module 140, fixing portions 160 and a fixing member 170. The fixing portions 160 are formed on the receiving container 110, the molded frame 120 and the lamp assembly 130, respectively.

The receiving container 110 includes a bottom plate 112, a first sidewall 113, a second sidewall 114, a third sidewall 115 and a fourth sidewall 116. The bottom plate 112 has a rectangular plate shape. The first, second, third and fourth sidewalls 113, 114, 115 and 116 protrude from the edges of the bottom plate 112 to form a receiving space 112a.

In this exemplary embodiment, end portions 114a and 116a of the second and fourth sidewalls 114 and 116 are bent toward the receiving space 112a so that the receiving space 112a adjacent to corners of the receiving container 110 is partially opened. In this exemplary embodiment, the bent end portions 114a and 116a of the second and fourth sidewalls 114 and 116 are substantially perpendicular to remaining portions of the second and fourth sidewalls 114 and 116. The bent end portions 114a and 116a prevent drifting of the optical member 140.

Figure 9:
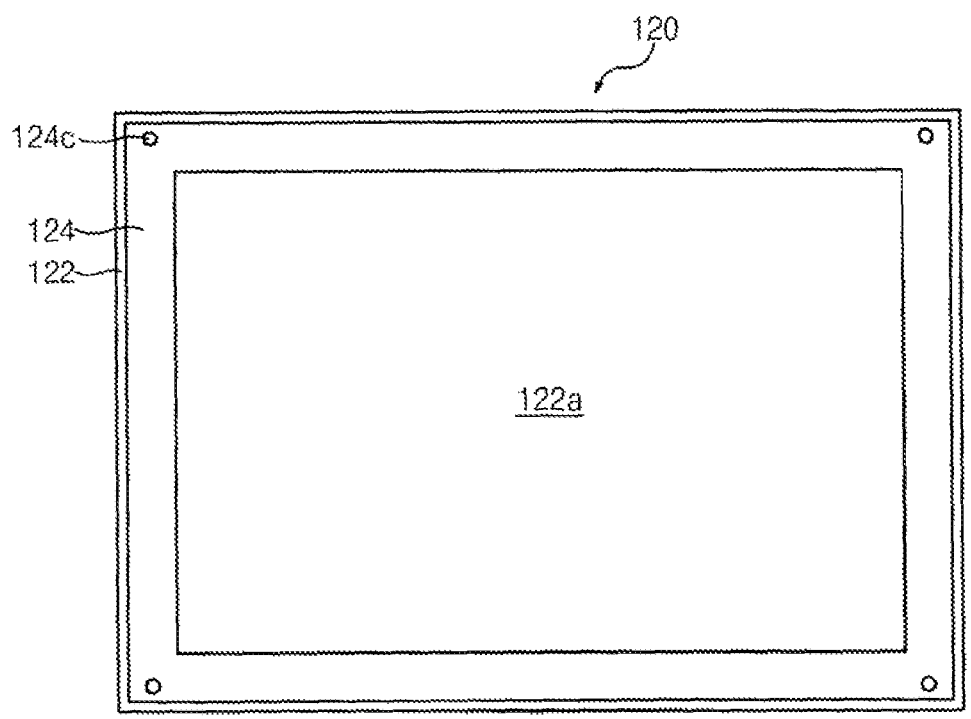
FIG. 9 is a plan view showing a rear face of a molded frame of FIG. 7.

FIG. 9 is a plan view showing a rear face of a molded frame 120 of FIG. 7.

Referring to FIGS. 7 and 9, the molded frame 120 is combined with the receiving container 110. The molded frame 120 includes a first plate 122 and a second plate 124.

The first plate 122 is combined with the first, second, third and fourth sidewalls 113, 114, 115 and 116 of the receiving container 110. The first plate 122 is positioned on the outer surfaces of the first, second, third and fourth sidewalls 113, 114, 115 and 116. The first plate 122 may include a hook for hooking the first, second, third and fourth sidewalls 113, 114, 115 and 116. The second plate 124 extends from an edge of the first plate 122, and is substantially parallel with the bottom plate 112. The second plate 124 has a quadrangular frame shape including an opening 122a on a central portion of the second plate 124.

Figure 10:
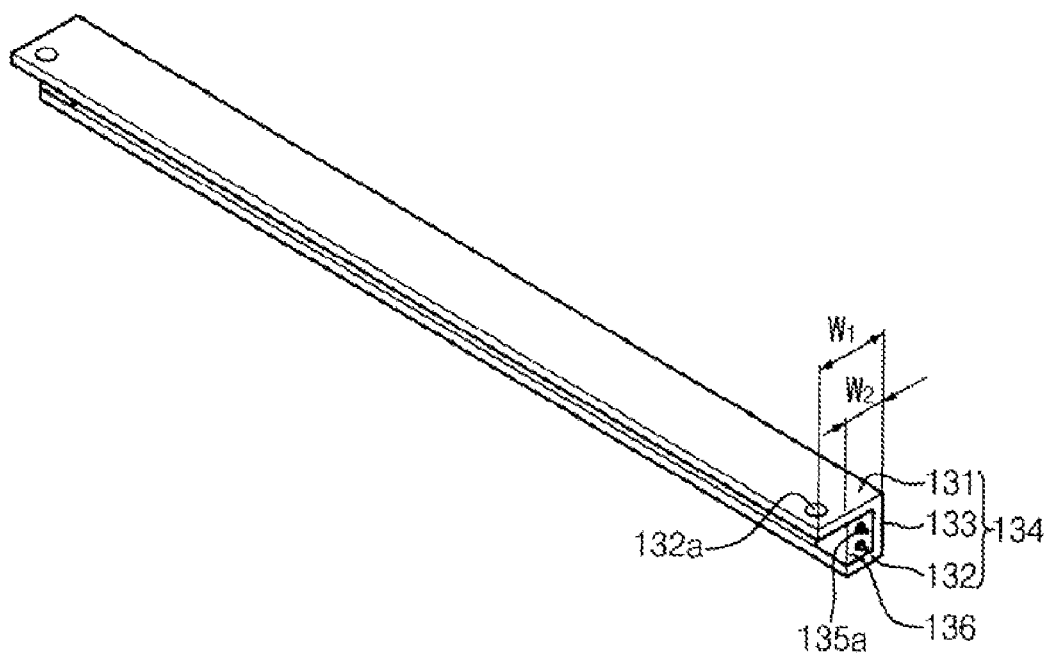
FIG. 10 is a perspective view showing a lamp assembly of FIG. 7.

FIG. 10 is a perspective view showing a lamp assembly 130 of FIG. 7.

Referring to FIGS. 7 and 10, the lamp assembly 130 includes a lamp cover 134 and a lamp 135. The lamp assembly 130 may further include a lamp holder 136.

The lamp cover 134 is received in the receiving space 112a of the receiving container 110. A light generated from the lamp 135 is reflected from the lamp cover 134 to be guided into a central portion of the backlight assembly 100.

In this exemplary embodiment, the lamp cover 134 includes a first light reflecting plate 131, a second light reflecting plate 132 and a third light reflecting plate 133.

The first light reflecting plate 131 has a plate shape, and is substantially parallel with the bottom plate 112 of the receiving container 110. The second light reflecting plate 132 is substantially parallel with the second plate 124 of the molded frame 120. The third light reflecting plate 133 is substantially parallel with the first sidewall 113 and the third sidewall 115. The third light reflecting plate 133 makes contact with one of the first and third sidewalls 113 and 115, and connects the first light reflecting plate 131 to the second light reflecting plate 132.

A first width W1 of the first light reflecting plate 131 is wider than a second width W2 of the second light reflecting plate 132.

The lamp 135 of the lamp assembly 130 generates the light that is emitted in a radial direction based on a driving voltage that is provided from a power source external to the lamp assembly 130. In this exemplary embodiment, the lamp 135 is a cold cathode fluorescent lamp (CCFL) having a cylindrical shape.

The lamp 135 is received in the lamp cover 134, and the light is reflected from the first, second and third light reflecting plates 131, 132 and 133 to be guided into a space between the first and second light reflecting plates 131 and 132.

The lamp 135 may be fixed to a lamp holder 136 so that the lamp 135 is fixed on the lamp cover 134 at a predetermined position. The lamp holder 136 has a rectangular parallelepiped shape. The lamp holder 136 has a lamp fixing hole 135a into which an end portion of the lamp 135 is inserted. The lamp holder 136 is combined with the lamp cover 134.

Referring again to FIG. 7, the optical module 140 is received in the receiving space 112a of the receiving container 110. The optical module 140 modulates optical characteristics of the light generated from the lamp 135. The optical module 140 may include a reflecting plate 142, a light guiding plate 144, optical sheets 146, etc.

The reflecting plate 142 is positioned adjacent to the bottom plate 112 of the receiving container 110. The light guiding plate 144 is positioned adjacent to the reflecting plate 142. The light guiding plate 144 has a rectangular parallelepiped shape. The light guiding plate 144 guides the light from the lamp assembly 130 into the optical sheets 146. The optical sheets 146 are positioned adjacent to the light guiding plate 144. The optical sheets 146 diffuse the light from the light guiding plate 144, and a luminance when viewed in a plan view of the backlight assembly 100 is improved by the optical sheets 146.

The fixing portions 160 includes a first fixing hole 132a, a second fixing hole 124c and a third fixing hole 112d. The first fixing hole 132a is formed on the lamp assembly 130. The second fixing hole 124c is formed on the molded frame 120. The third fixing hole 112d is formed on the receiving container 110. The receiving container 110, the lamp assembly 130 and the molded frame 120 are combined with one another by the fixing member 170. In this exemplary embodiment, the fixing member 170 is a screw that is inserted into the first, second and third fixing holes 132a, 124c and 112d.

Figure 11:
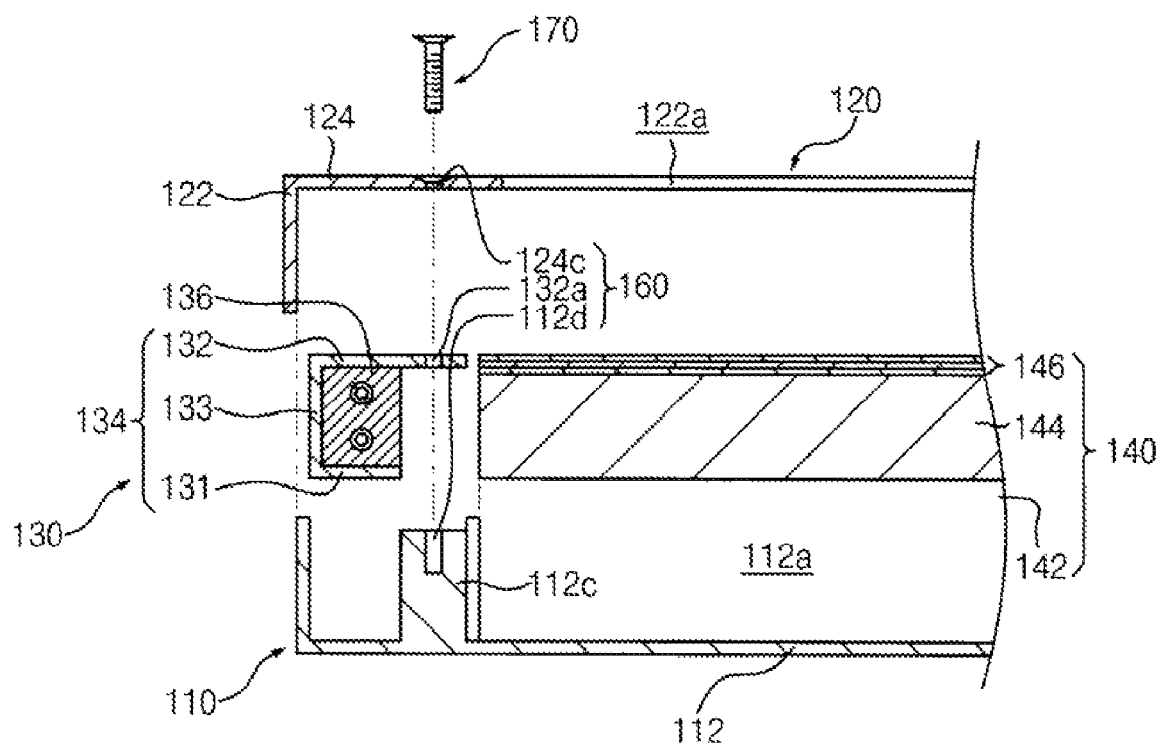
FIG. 11 is a cross-sectional view taken along a line $II^1$-$II^2$ of FIG. 7.

FIG. 11 is a cross-sectional view taken along a line II$^1$-II$^2$ of FIG. 7.

Referring to FIGS. 7, 8 and 11, the first fixing hole 132a is formed on the second light reflecting plate 132 that is positioned adjacent to the second plate 124 of the molded frame 120. The second fixing hole 124c is formed on the second plate 124 of the molded frame 120.

The second fixing hole 124c of the molded frame 120 is positioned to correspond to the first fixing hole 132a of the lamp cover 134.

The receiving container 110 has a fixing boss 112c between the bottom plate 112 and the bent end portions 114a and 116a of the second and fourth sidewalls 114 and 116. The third fixing hole 112d is formed in the fixing boss 112c. The third fixing hole 112d is positioned to correspond to the first fixing hole 132a. Therefore, the first, second and third fixing holes 132a, 124c and 112d are substantially coaxial.

Figure 12:
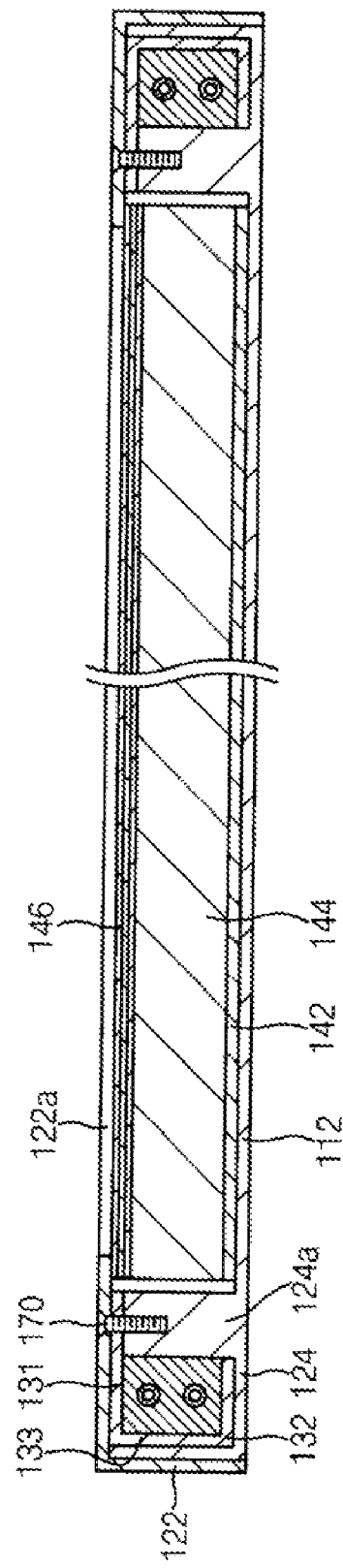
FIG. 12 is a cross-sectional view showing the backlight assembly of FIG. 7.

FIG. 12 is a cross-sectional view showing the backlight assembly of FIG. 7.

Referring to FIG. 12, the fixing member 170 that is the screw is inserted into the first fixing hole 132a formed on the second light reflecting plate 132 of the lamp cover 130, the second fixing hole 124c formed on the second plate 124 of the molded frame 120 and the third fixing hole 112d formed on the fixing boss 112c of the receiving container 110. That is, the screw is inserted into the third fixing hole 112d through the first and second fixing holes 132a and 124c. Therefore, the receiving container 110, the lamp assembly 130 and the molded frame 120 are securely fixed to one another using the fixing member 170.

Figure 13:
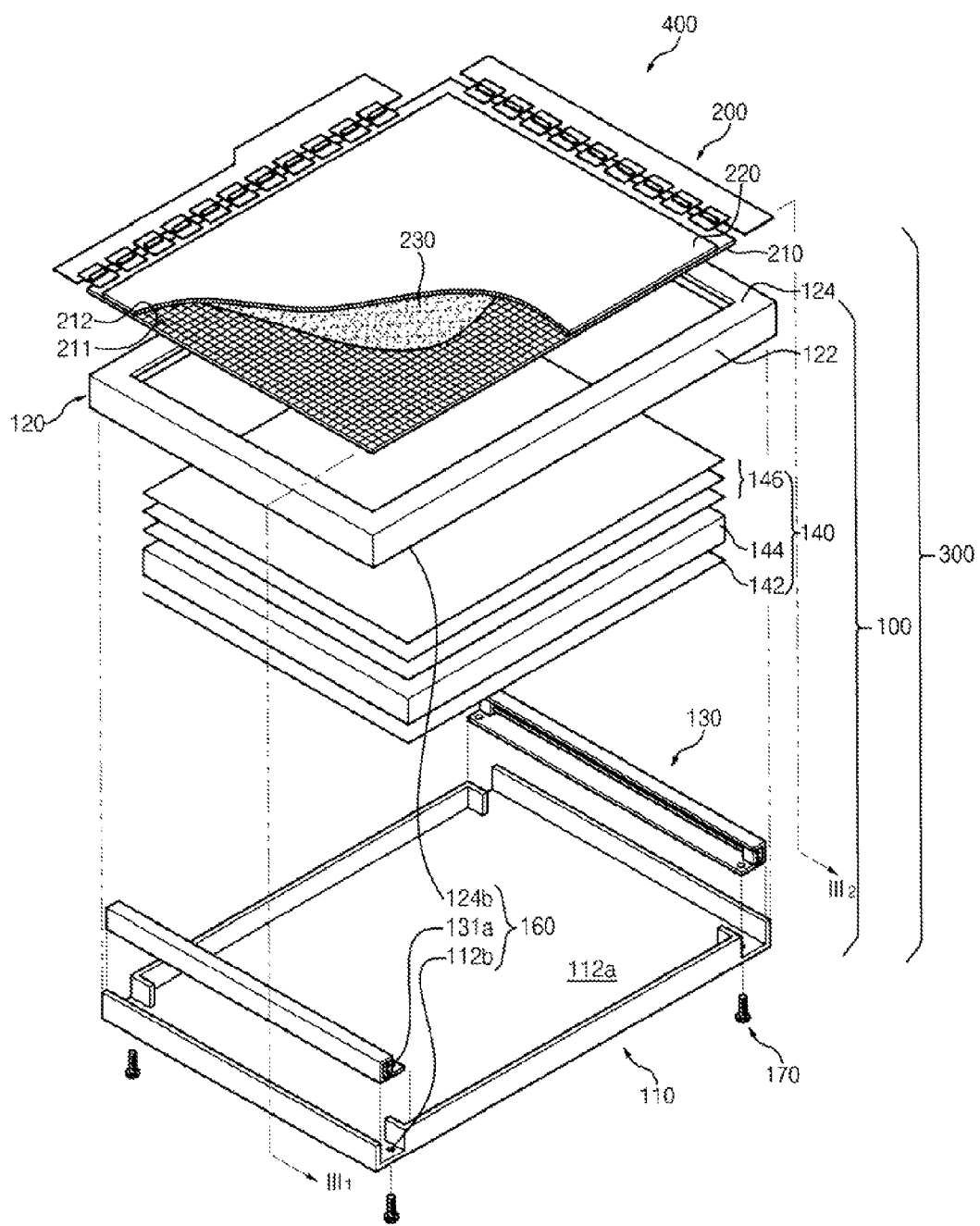
FIG. 13 is an exploded perspective view showing a display device in accordance with another exemplary embodiment of the present invention.
Figure 14:
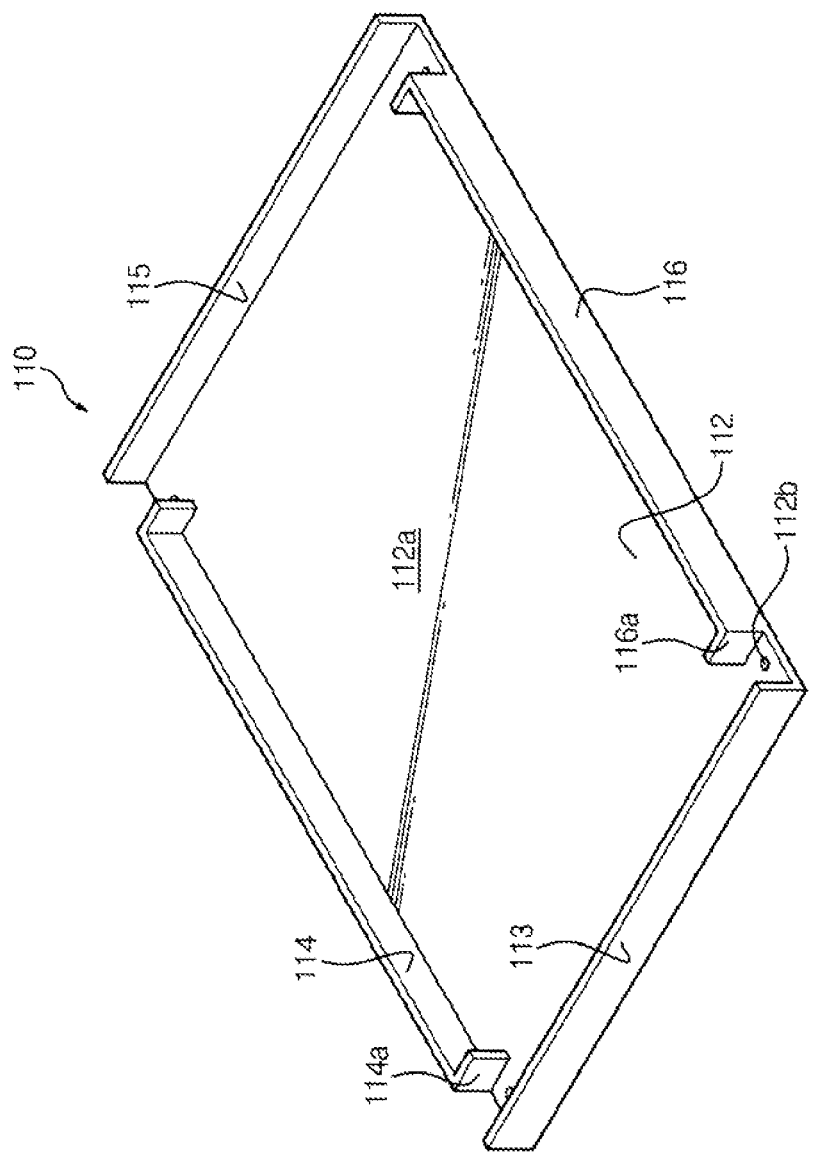
FIG. 14 is a perspective view showing a receiving container of FIG. 13.

FIG. 13 is an exploded perspective view showing a display device in accordance with another exemplary embodiment of the present invention. FIG. 14 is a perspective view showing a receiving container of FIG. 13. The backlight assembly of FIGS. 13 and 14 is substantially the same as in FIGS. 1 to 6. Thus, the same reference numerals will be used to refer to the same or similar parts as those described in FIGS. 1 to 6 and any further explanation will be omitted.

Referring to FIGS. 13 and 14, the display device 300 includes the backlight assembly 100 and a display panel 200.

The backlight assembly 100 includes a receiving container 110, a molded frame 120, a lamp assembly 130, an optical module 140, fixing portions 160 and a fixing member 170. The fixing portions 160 are formed on the receiving container 110, the molded frame 120 and the lamp assembly 130, respectively.

The receiving container 110 includes a bottom plate 112, a first sidewall 113, a second sidewall 114, a third sidewall 115 and a fourth sidewall 116. The bottom plate 112 has a rectangular plate shape. The first, second, third and fourth sidewalls 113, 114, 115 and 116 protrude from the edges of the bottom plate 112 to form a receiving space 112a.

In this exemplary embodiment, end portions 114a and 116a of the second and fourth sidewalls 114 and 116 are bent toward the receiving space 112a so that the receiving space 112a adjacent to corners of the receiving container 110 is partially opened. In this exemplary embodiment, the bent end portions 114a and 116a of the second and fourth sidewalls 114 and 116 are substantially perpendicular to remaining portions of the second and fourth sidewalls 114 and 116. The bent end portions 114a and 116a prevent drifting of the optical member 140.

Figure 15:
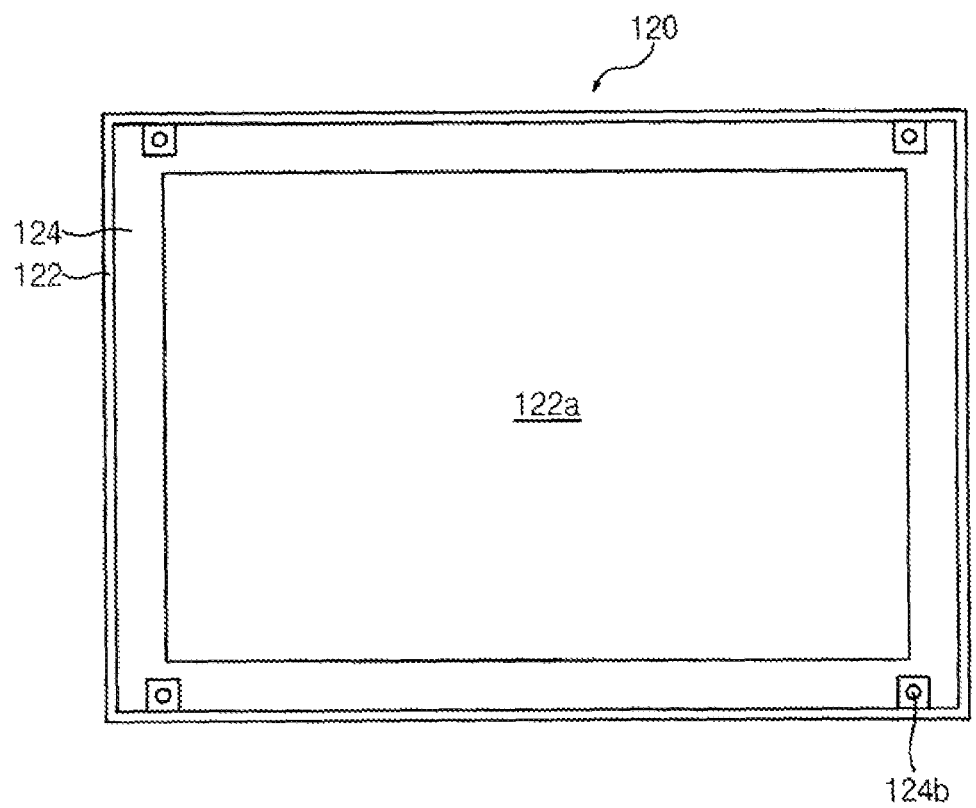
FIG. 15 is a plan view showing a rear face of a molded frame of FIG. 13.

FIG. 15 is a plan view showing a rear face of a molded frame of FIG. 13.

Referring to FIGS. 13 and 15, the molded frame 120 is combined with the receiving container 110. The molded frame 120 includes a first plate 122 and a second plate 124.

The first plate 122 is combined with the first, second, third and fourth sidewalls 113, 114, 115 and 116 of the receiving container 110. When the molded frame is mated with the receiving container 110, the first plate 122 is positioned adjacent to the outer surfaces of the first, second, third and fourth sidewalls 113, 114, 115 and 116. The first plate 122 may include a hook for hooking the first, second, third and fourth sidewalls 113, 114, 115 and 116. The second plate 124 is extends from the edges of the first plate 122, and is substantially parallel with the bottom plate 112. The second plate 124 has a quadrangular frame shape including an opening 122a on a central portion of the second plate 124.

Figure 16:
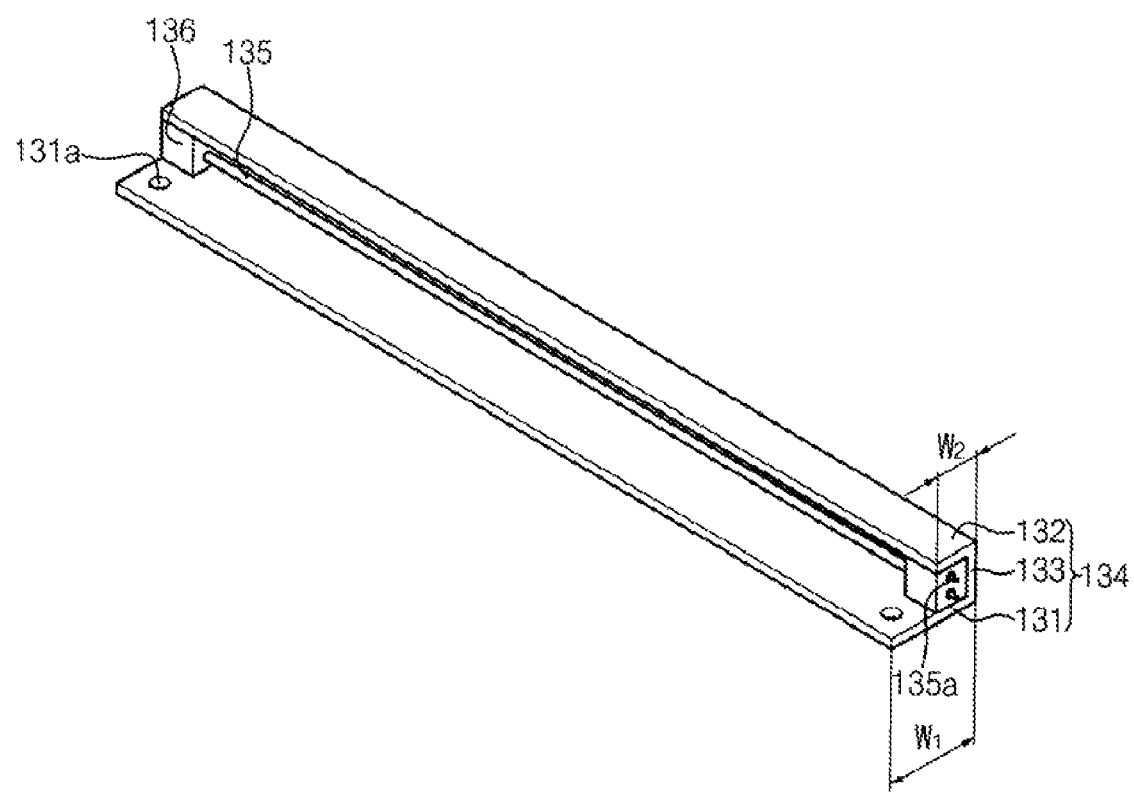
FIG. 16 is a perspective view showing a lamp assembly of FIG. 13.

FIG. 16 is a perspective view showing a lamp assembly of FIG. 13.

Referring to FIGS. 13 and 16, the lamp assembly 130 includes a lamp cover 134 and a lamp 135. The lamp assembly 130 may further include a lamp holder 136.

The lamp cover 134 is received in the receiving space 112a of the receiving container 110. A light generated from the lamp 135 is reflected from the lamp cover 134 to be guided into a central portion of the backlight assembly 100.

In this exemplary embodiment, the lamp cover 134 includes a first light reflecting plate 131, a second light reflecting plate 132 and a third light reflecting plate 133.

The first light reflecting plate 131 has a plate shape, and is substantially parallel with the bottom plate 112 of the receiving container 110. The second light reflecting plate 132 is substantially parallel with the second plate 124 of the molded frame 120. The third light reflecting plate 133 is substantially parallel with the first sidewall 113 and/or the third sidewall 115. The third light reflecting plate 133 makes contact with one of the first and third sidewalls 113 and 115, and connects the first light reflecting plate 131 to the second light reflecting plate 132.

A first width W1 of the first light reflecting plate 131 is greater than a second width W2 of the second light reflecting plate 132.

The lamp 135 of the lamp assembly 130 generates the light that is emitted in a radial direction based on a driving voltage that is provided from a power source external to the lamp assembly 130. In this exemplary embodiment, the lamp 135 is a cold cathode fluorescent lamp (CCFL) having a cylindrical shape.

The lamp 135 is received in the lamp cover 134, and the light is reflected from the first, second and third light reflecting plates 131, 132 and 133 to be guided into a space between the first and second light reflecting plates 131 and 132.

The lamp 135 may be fixed to a lamp holder 136 so that the lamp 135 is fixed on the lamp cover 134 at a predetermined position. The lamp holder 136 has a rectangular parallelepiped shape. The lamp holder 136 has a lamp fixing hole 135a into which an end portion of the lamp 135 is inserted. The lamp holder 136 is combined with the lamp cover 134.

Referring again to FIG. 13, the optical module 140 is received in the receiving space 112a of the receiving container 110. The optical module 140 modulates optical characteristics of the light generated from the lamp 135. The optical module 140 may include a reflecting plate 142, a light guiding plate 144, optical sheets 146, etc.

The reflecting plate 142 is positioned adjacent to the bottom plate 112 of the receiving container 110. The light guiding plate 144 is positioned adjacent to the reflecting plate 142. The light guiding plate 144 has a rectangular parallelepiped shape. The light guiding plate 144 guides the light from the lamp assembly 130 into the optical sheets 146. The optical sheets 146 are positioned adjacent to the light guiding plate 144. The optical sheets 146 diffuse the light from the light guiding plate 144, and a luminance when viewed in a plan view of the backlight assembly 100 is improved by the optical sheets 146.

The fixing portions 160 includes a first fixing hole 131a, a second fixing hole 112b and a third fixing hole 124b. The first fixing hole 131a is formed on the lamp assembly 130. The second fixing hole 112b is formed on the receiving container 110. The third fixing hole 124b is formed on the molded frame 120. The receiving container 110, the lamp assembly 130 and the molded frame 120 are combined with one another by the fixing member 170. In this exemplary embodiment, the fixing member 170 is a screw that is inserted into the first, second and third fixing holes 112b, 131a and 124b.

Figure 17:
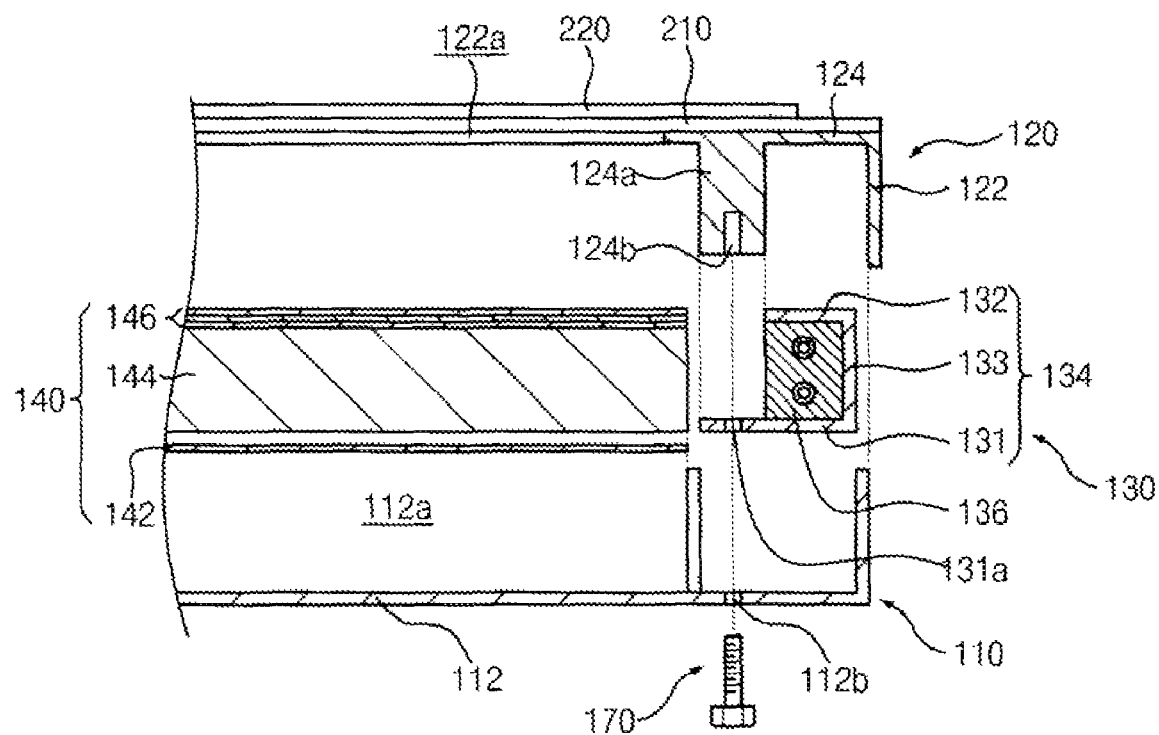
FIG. 17 is a cross-sectional view taken along a line $III^1$-$III^2$ of FIG. 13.

FIG. 17 is a cross-sectional view taken along a line $III^1$-$III^2$ of FIG. 13.

Referring to FIGS. 13, 14 and 17, the first fixing hole 131a is formed on the first light reflecting plate 131 that is positioned adjacent to the bottom plate 112. The second fixing hole 112b is formed on the bottom plate 112 of the receiving container 110 adjacent to the edge of the bottom plate 112.

The second fixing hole 112b of the receiving container 110 is positioned to correspond to the first fixing hole 131a of the lamp cover 134.

The molded frame 120 has a fixing boss 124a on the second plate 124. The third fixing hole 124b is formed in the fixing boss 124a. The third fixing hole 124b is positioned to correspond to the first fixing hole 131a. Therefore, the first, second and third fixing holes 131a, 112b and 124b are substantially coaxial.

Figure 18:
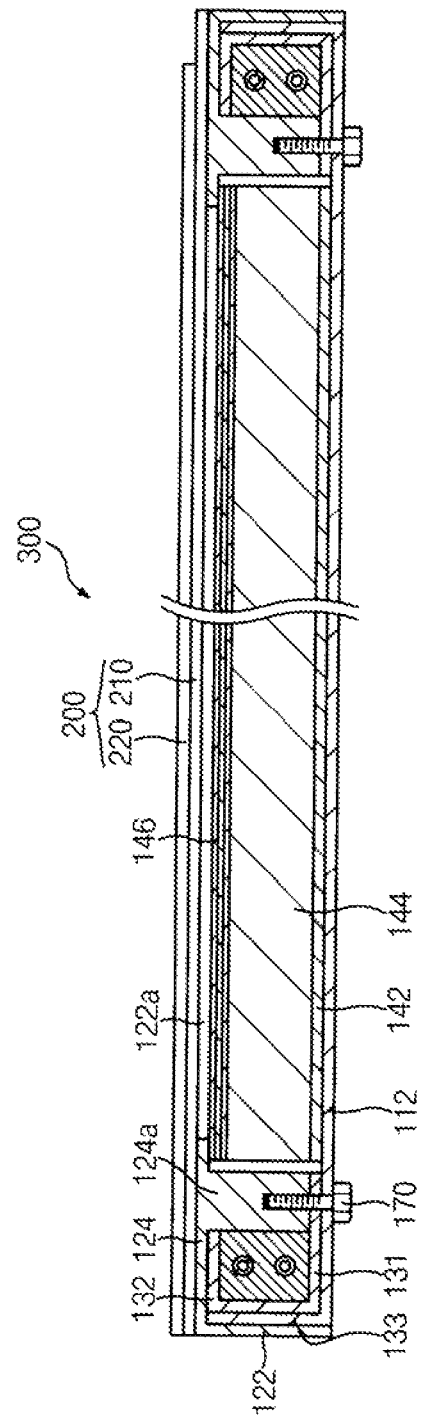
FIG. 18 is a cross-sectional view showing a display device of FIG. 13.

FIG. 18 is a cross-sectional view showing the backlight assembly of FIG. 17.

Referring to FIG. 18, the fixing member 170 that is the screw is inserted into the first fixing hole 131a formed on the first light reflecting plate 131 of the lamp cover 130, the second fixing hole 112b formed on the bottom plate 112 of the receiving container 110 and the third fixing hole 124b formed on the fixing boss 124a of the molded frame 120. That is, the screw is inserted into the third fixing hole 124b through the first and second fixing holes 131a and 112b. Therefore, the receiving container 110, the lamp assembly 130 and the molded frame 120 are securely fixed to one another using the fixing member 170.

The display panel 200 includes a first substrate 210, a second substrate 220 and a liquid crystal layer 230 that is interposed between the first and second substrates 210 and 220.

The first substrate 210 includes a plurality of first signal lines 211 and a plurality of second signal lines 212. The first signal lines 211 are extended in a first direction. The second signal lines 212 are extended in a second direction that is substantially perpendicular to the first direction.

A thin film transistor (TFT) is formed adjacent to an overlapped region between each of the first signal lines 211 and each of the second signal lines 212. The TFT includes a gate electrode, a channel layer, a source electrode and a drain electrode. The gate electrode is electrically connected to each of the first signal lines 211. The source electrode is electrically connected to each of the second signal lines 212. The channel layer is electrically insulated from the gate electrode, and is over the gate electrode. The source electrode and the drain electrode are on the channel layer, and the source electrode is spaced apart from the drain electrode.

A pixel electrode (not shown) is formed in a region defined by the first and second signal lines 211 and 212 adjacent to each other. The pixel electrode includes a transparent conductive material such as indium tin oxide (ITO), indium zinc oxide (IZO), etc. In this exemplary embodiment, an amorphous indium tin oxide (a-ITO) film is patterned to form the pixel electrode. The pixel electrode is electrically connected to the drain electrode of the TFT.

The second substrate 220 corresponds to the first substrate 210. The second substrate 220 includes color filters (not shown) and a common electrode (not shown). The color filters include a red color filter portion, a green color filter portion and a blue color filter portion. In this exemplary embodiment, the common electrode is formed on an entire surface of the second surface 220 having the color filters.

The liquid crystal layer 230 is interposed between the pixel electrode of the first substrate 210 and the common electrode of the second substrate 220.

Figure 19:
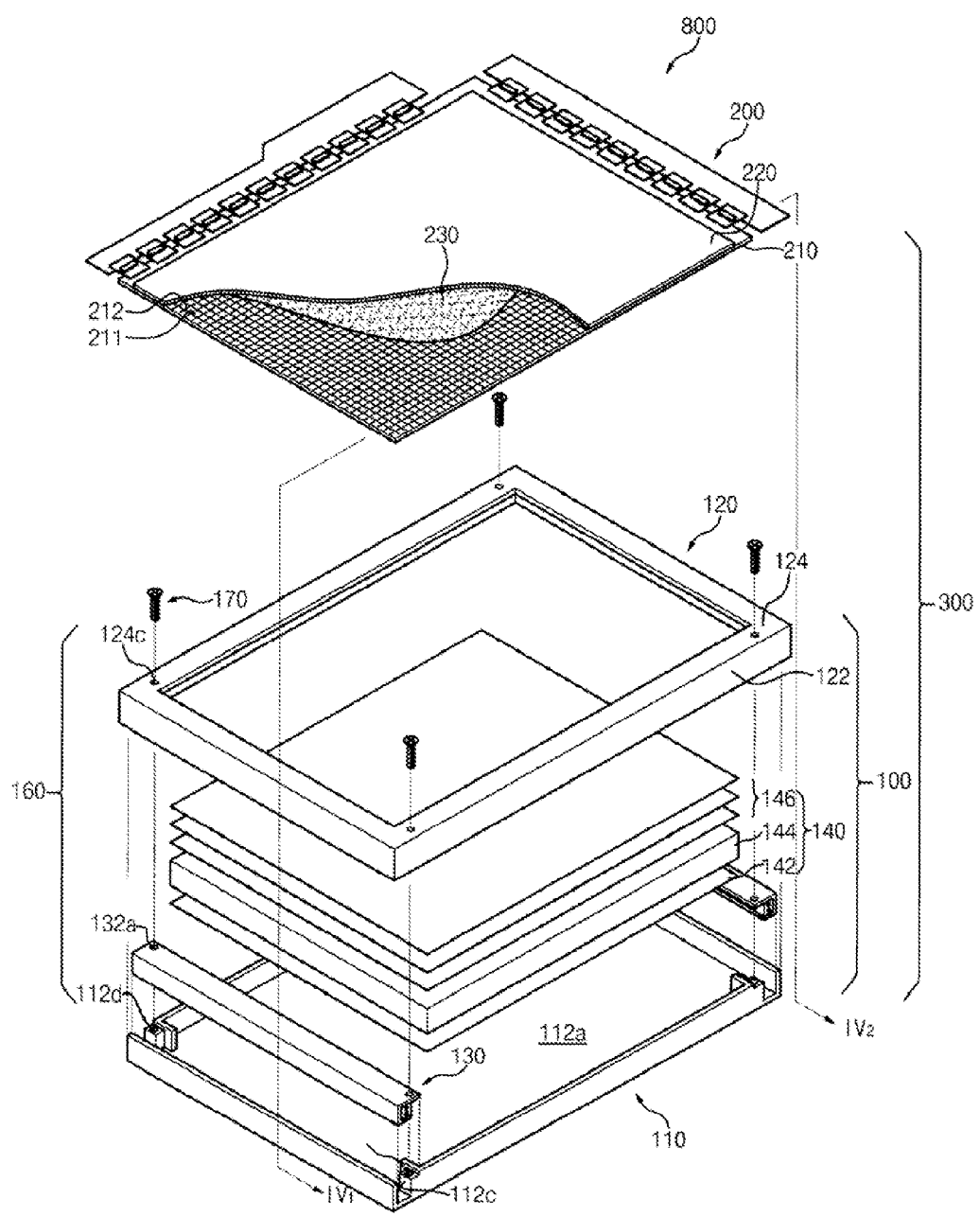
FIG. 19 is an exploded perspective view showing a display device in accordance with another exemplary embodiment of the present invention.
Figure 20:
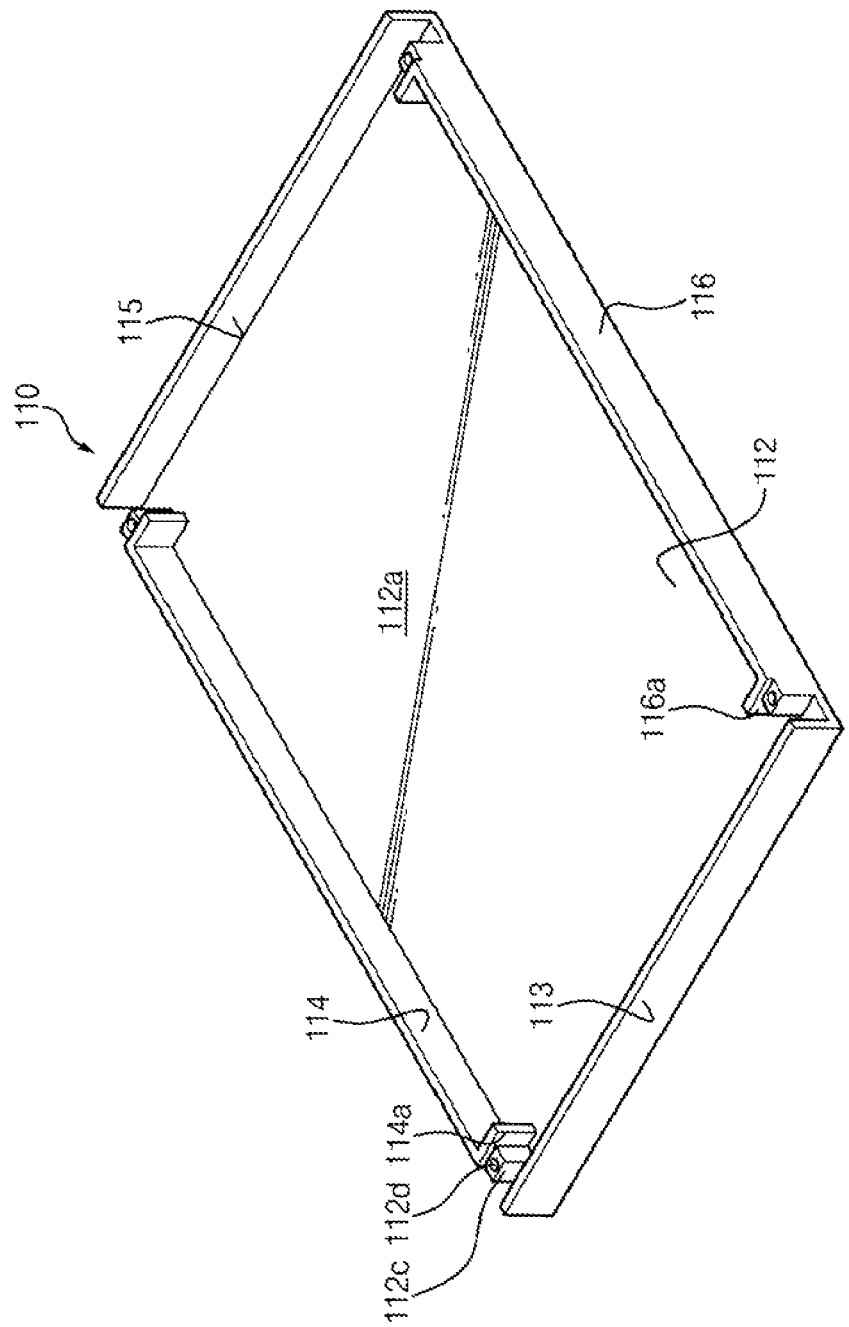
FIG. 20 is a perspective view showing a receiving container of FIG. 19.

FIG. 19 is an exploded perspective view showing a display device in accordance with another exemplary embodiment of the present invention. FIG. 20 is a perspective view showing a receiving container of FIG. 19. A backlight assembly of FIGS. 19 and 20 is substantially the same as the backlight assembly shown in FIGS. 7 to 12. Thus, the same reference numerals will be used to refer to the same or similar parts as those described in FIGS. 7 to 12 and any further explanation will be omitted.

Referring to FIGS. 19 and 20, the display device 300 includes a backlight assembly 100 and a display panel 200.

The backlight assembly 100 includes a receiving container 110, a molded frame 120, a lamp assembly 130, an optical module 140, fixing portions 160 and a fixing member 170. The fixing portions 160 are formed on the receiving container 110, the molded frame 120 and the lamp assembly 130, respectively.

The receiving container 110 includes a bottom plate 112, a first sidewall 113, a second sidewall 114, a third sidewall 115 and a fourth sidewall 116. The bottom plate 112 has a rectangular plate shape. The first, second, third and fourth sidewalls 113, 114, 115 and 116 protrude from the edges of the bottom plate 112 to form a receiving space 112a.

In this exemplary embodiment, end portions 114a and 116a of the second and fourth sidewalls 114 and 116 are bent toward the receiving space 112a so that the receiving space 112a adjacent to corners of the receiving container 110 is partially opened. In this exemplary embodiment, the bent end portions 114a and 116a of the second and fourth sidewalls 114 and 116 are substantially perpendicular to remaining portions of the second and fourth sidewalls 114 and 116. The bent end portions 114a and 116a prevent drifting of the optical member 140.

Figure 21:
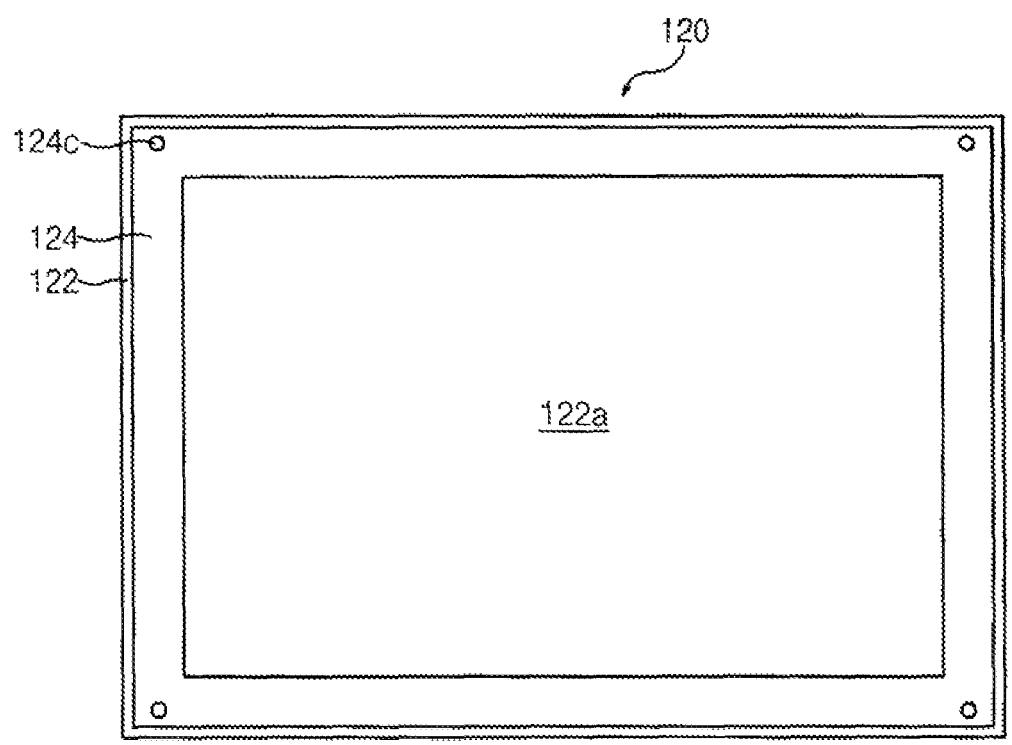
FIG. 21 is a plan view showing a rear face of a molded frame of FIG. 19.

FIG. 21 is a plan view showing a rear face of a molded frame of FIG. 19.

Referring to FIGS. 19 and 21, the molded frame 120 is combined with the receiving container 110. The molded frame 120 includes a first plate 122 and a second plate 124.

The first plate 122 is combined with the first, second, third and fourth sidewalls 113, 114, 115 and 116 of the receiving container 110. The first plate 122 is positioned on the outer surfaces of the first, second, third and fourth sidewalls 113, 114, 115 and 116. The first plate 122 may include a hook for hooking the first, second, third and fourth sidewalls 113, 114, 115 and 116. The second plate 124 extends from an edge of the first plate 122, and is substantially parallel with the bottom plate 112. The second plate 124 has a quadrangular frame shape including an opening 122a on a central portion of the second plate 124.

Figure 22:
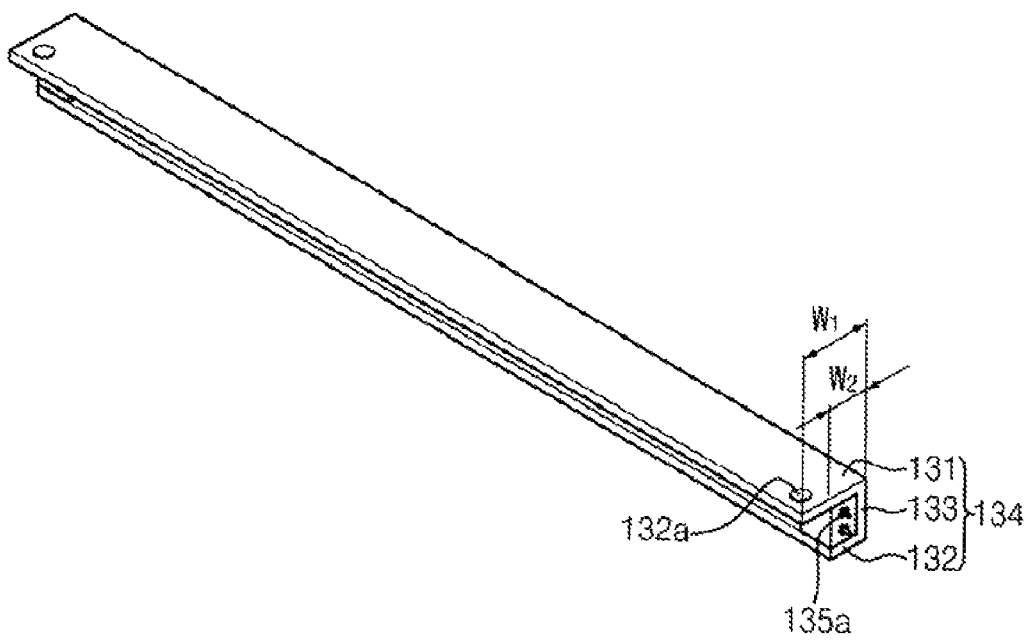
FIG. 22 is a perspective view showing a lamp assembly of FIG. 19.

FIG. 22 is a perspective view showing a lamp assembly of FIG. 19.

Referring to FIGS. 19 and 22, the lamp assembly 130 includes a lamp cover 134 and a lamp 135. The lamp assembly 130 may further include a lamp holder 136.

The lamp cover 134 is received in the receiving space 112a of the receiving container 110. A light generated from the lamp 135 is reflected from the lamp cover 134 to be guided into a central portion of the backlight assembly 100.

In this exemplary embodiment, the lamp cover 134 includes a first light reflecting plate 131, a second light reflecting plate 132 and a third light reflecting plate 133.

The first light reflecting plate 131 has a plate shape, and is substantially parallel with the bottom plate 112 of the receiving container 110. The second light reflecting plate 132 is substantially parallel with the second plate 124 of the molded frame 120. The third light reflecting plate 133 is substantially parallel with the first sidewall 113 and the third sidewall 115. The third light reflecting plate 133 makes contact with one of the first and third sidewalls 113 and 115, and connects the first light reflecting plate 131 to the second light reflecting plate 132.

A first width W1 of the first light reflecting plate 131 is wider than a second width W2 of the second light reflecting plate 132.

The lamp 135 of the lamp assembly 130 generates the light that is emitted in a radial direction based on a driving voltage that is provided from a power source external to the lamp assembly 130. In this exemplary embodiment, the lamp 135 is a cold cathode fluorescent lamp (CCFL) having a cylindrical shape.

The lamp 135 is received in the lamp cover 134, and the light is reflected from the first, second and third light reflecting plates 131, 132 and 133 to be guided into a space between the first and second light reflecting plates 131 and 132.

The lamp 135 may be fixed to a lamp holder 136 so that the lamp 135 is fixed on the lamp cover 134 at a predetermined position. The lamp holder 136 has a rectangular parallelepiped shape. The lamp holder 136 has a lamp fixing hole 135a into which an end portion of the lamp 135 is inserted. The lamp holder 136 is combined with the lamp cover 134.

Referring again to FIG. 19, the optical module 140 is received in the receiving space 112a of the receiving container 110. The optical module 140 modulates optical characteristics of the light generated from the lamp 135. The optical module 140 may include a reflecting plate 142, a light guiding plate 144, optical sheets 146, etc.

The reflecting plate 142 is positioned adjacent to the bottom plate 112 of the receiving container 110. The light guiding plate 144 is positioned adjacent to the reflecting plate 142. The light guiding plate 144 has a rectangular parallelepiped shape. The light guiding plate 144 guides the light from the lamp assembly 130 into the optical sheets 146. The optical sheets 146 are positioned adjacent to the light guiding plate 144. The optical sheets 146 diffuse the light from the light guiding plate 144, and a luminance when viewed in a plan view of the backlight assembly 100 is improved by the optical sheets 146.

The fixing portions 160 include a first fixing hole 132a, a second fixing hole 124c and a third fixing hole 112d. The first fixing hole 132a is formed on the lamp assembly 130. The second fixing hole 124c is formed on the molded frame 120. The third fixing hole 112d is formed on the receiving container 110. The receiving container 110, the lamp assembly 130 and the molded frame 120 are combined with one another by the fixing member 170. In this exemplary embodiment, the fixing member 170 is a screw that is inserted into the first, second and third fixing holes 132a, 124c and 112d.

Figure 23:
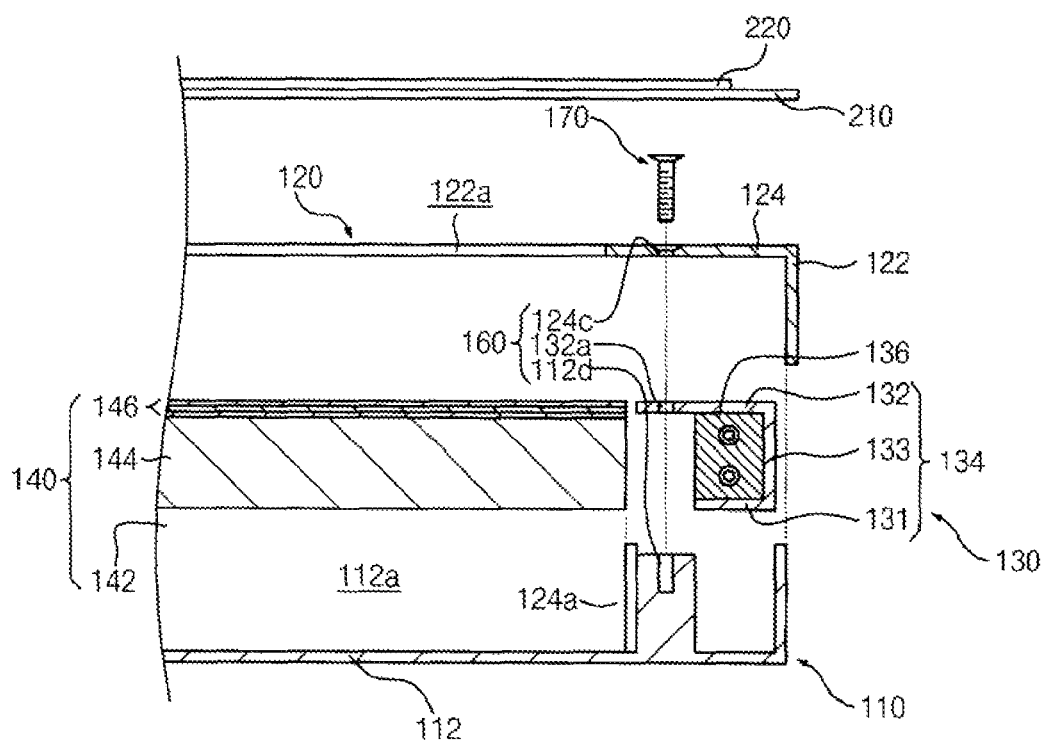
FIG. 23 is a cross-sectional view taken along a line $VI^1$-$VI^2$ of FIG. 19.

FIG. 23 is a cross-sectional view taken along a line $IV^1$-$IV^2$ of FIG. 19.

Referring to FIGS. 19, 20 and 23, the first fixing hole 132a is formed on the second light reflecting plate 132 that is positioned adjacent to the second plate 124 of the molded frame 120. The second fixing hole 124c is formed on the second plate 124 of the molded frame 120.

The second fixing hole 124c of the molded frame 120 is positioned to correspond to the first fixing hole 132a of the lamp cover 134.

The receiving container 110 has a fixing boss 112c between the bottom plate 112 and the bent end portions 114a and 116a of the second and fourth sidewalls 114 and 116. The third fixing hole 112d is formed in the fixing boss 112c. The third fixing hole 112d is positioned to correspond to the first fixing hole 132a. Therefore, the first, second and third fixing holes 132a, 124c and 112d are substantially coaxial.

Figure 24:
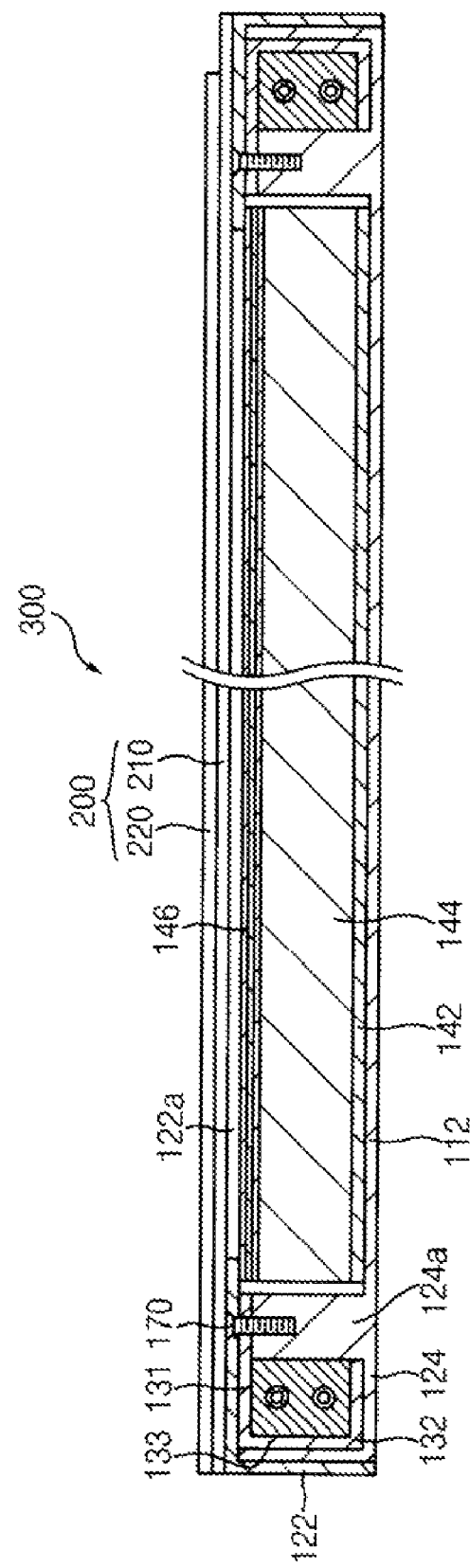
FIG. 24 is a cross-sectional view showing a display device of FIG. 19.

FIG. 24 is a cross-sectional view showing the backlight assembly of FIG. 19.

Referring to FIG. 24, the fixing member 170 that is the screw is inserted into the first fixing hole 132a formed on the second light reflecting plate 132 of the lamp cover 130, the second fixing hole 124c formed on the second plate 124 of the molded frame 120 and the third fixing hole 112d formed on the fixing boss 112c of the receiving container 110. That is, the screw is inserted into the third fixing hole 112d through the first and second fixing holes 132a and 124c. Therefore, the receiving container 110, the lamp assembly 130 and the molded frame 120 are securely fixed to one another using the fixing member 170.

The display panel 200 includes a first substrate 210, a second substrate 220 and a liquid crystal layer 230 that is interposed between the first and second substrates 210 and 220.

The first substrate 210 includes a plurality of first signal lines 211 and a plurality of second signal lines 212. The first signal lines 211 are extended in a first direction. The second signal lines 212 are extended in a second direction that is substantially perpendicular to the first direction.

A thin film transistor (TFT) is formed adjacent to an overlapped region between each of the first signal lines 211 and each of the second signal lines 212. The TFT includes a gate electrode, a channel layer, a source electrode and a drain electrode. The gate electrode is electrically connected to each of the first signal lines 211. The source electrode is electrically connected to each of the second signal lines 212. The channel layer is electrically insulated from the gate electrode, and is over the gate electrode. The source electrode and the drain electrode are on the channel layer, and the source electrode is spaced apart from the drain electrode.

A pixel electrode (not shown) is formed in a region defined by the first and second signal lines 211 and 212 adjacent to each other. The pixel electrode includes a transparent conductive material such as indium tin oxide (ITO), indium zinc oxide (IZO), etc. In this exemplary embodiment, an amorphous indium tin oxide (a-ITO) film is patterned to form the pixel electrode. The pixel electrode is electrically connected to the drain electrode of the TFT.

The second substrate 220 corresponds to the first substrate 210. The second substrate 220 includes color filters (not shown) and a common electrode (not shown). The color filters include a red color filter portion, a green color filter portion and a blue color filter portion. In this exemplary embodiment, the common electrode is formed on an entire surface of the second surface 220 having the color filters.

The liquid crystal layer 230 is interposed between the pixel electrode of the first substrate 210 and the common electrode of the second substrate 220.

According to the present invention, the receiving container, the lamp assembly and the molded frame comprise fixing portions, respectively, and a fixing member, such as a screw, is combined with the fixing portions. Therefore, the manufacturing process of the backlight assembly and the display apparatus can be simplified, and mechanical strength can be increased. In addition, the manufacturing time can be decreased.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display device comprising:
   a receiving container comprising a bottom plate, a plurality of sidewalls adjacent to edges of the bottom plate, and at least one fixing portion;
   a frame comprising a first plate that surrounds the sidewalls and a second plate that is connected to a side of the first plate, the second plate being substantially parallel with the bottom plate, and at least one fixing portion;
   a light source assembly comprising a light source cover received in the receiving container, a light source received in the light source cover and at least one fixing portion;
   an optical module interposed between the frame and the receiving container to improve optical characteristics of a light generated from the light source assembly;
   a fixing member connected to the at least one fixing portion of the receiving container, the at least one fixing portion of the frame, and the at least one fixing portion of the light source assembly to fix the receiving container, the light source cover and the frame to one another, an uppermost end of the fixing member positioned lower than the display panel; and
   a display panel on the frame to convert the light that has passed through the optical module into an image light.

2. The display device of claim 1, wherein the light source cover further comprises a first light reflecting plate that is substantially parallel with the bottom plate, a second light reflecting plate that is substantially parallel with the second plate of the frame, and a third light reflecting plate that is connected between the first and second light reflecting plates, wherein the third light reflecting plate is positioned adjacent to the sidewalls of the receiving container.

3. The display device of claim 2, wherein a first width of the first light reflecting plate is greater than a second width of the second light reflecting plate.

4. The display device of claim 3, wherein the fixing portions comprise a first fixing hole formed on the first light reflecting plate, a second fixing hole formed on the bottom plate to correspond to the first fixing hole, and a fixing boss formed on the second plate of the frame.

5. The display device of claim 4, wherein the fixing boss contacts the first light reflecting plate.

6. The display device of claim 4, wherein the fixing member comprises a screw.

7. The display device of claim 4, wherein a third fixing hole is formed in the fixing boss, and the third fixing hole corresponds to the first and second fixing holes.

8. The display device of claim 4, wherein the light source assembly further comprises a light source holder to fix the light source to the light source cover, and the first fixing hole is adjacent to the light source holder.

9. The display device of claim 2, wherein a first width of the second light reflecting plate is greater than a second width of the first light reflecting plate.

10. The display device of claim 9, wherein the fixing portions comprise a first fixing hole formed on the second light reflecting plate, a second fixing hole formed on the second plate to correspond to the first fixing hole, and a fixing boss formed on the bottom plate.

11. The display device of claim 10, wherein the fixing boss makes contact with the second light reflecting plate.

12. The display device of claim 10, wherein a third fixing hole is formed in the fixing boss, and the third fixing hole corresponds to the first and second fixing holes.

13. The display device of claim 10, wherein the light source assembly further comprises a light source holder to fix the light source to the light source cover, and the first fixing hole is adjacent to the light source holder.

* * * * *